(12) United States Patent
Osborne

(10) Patent No.: US 12,379,302 B2
(45) Date of Patent: *Aug. 5, 2025

(54) FLOW CYTOMETER WITH ADJUSTABLE POSITIONAL OFFSET SORT DEFLECTION PLATES AND METHODS OF USING THE SAME

(71) Applicant: Becton, Dickinson and Company, Franklin Lakes, NJ (US)

(72) Inventor: Geoffrey Osborne, Bellbowrie (AU)

(73) Assignee: Becton, Dickinson and Company, Franklin Lakes, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/516,603

(22) Filed: Nov. 21, 2023

(65) Prior Publication Data

US 2024/0102911 A1 Mar. 28, 2024

Related U.S. Application Data

(63) Continuation of application No. 17/211,416, filed on Mar. 24, 2021, now Pat. No. 11,867,605.

(60) Provisional application No. 63/041,597, filed on Jun. 19, 2020.

(51) Int. Cl.
| | | |
|---|---|---|
| *G01N 15/1404* | (2024.01) | |
| *G01N 15/14* | (2006.01) | |
| *G01N 15/1492* | (2024.01) | |
| *G01N 15/149* | (2024.01) | |

(52) U.S. Cl.
CPC ..... *G01N 15/1404* (2013.01); *G01N 15/1459* (2013.01); *G01N 15/1492* (2024.01); *G01N 2015/1415* (2013.01); *G01N 15/149* (2024.01)

(58) Field of Classification Search
CPC ........... G01N 15/1404; G01N 15/1459; G01N 15/1492; G01N 15/149; G01N 2015/1415
See application file for complete search history.

(56) References Cited

U.S. PATENT DOCUMENTS

| | | | | |
|---|---|---|---|---|
| 3,971,033 A | * | 7/1976 | Fan | B41J 2/10 |
| | | | | 347/53 |
| 4,367,476 A | * | 1/1983 | Sagae | B41J 2/115 |
| | | | | 347/78 |
| 5,049,899 A | * | 9/1991 | Dunand | B41J 2/02 |
| | | | | 347/76 |

(Continued)

FOREIGN PATENT DOCUMENTS

JP 2005535346 A 11/2005

*Primary Examiner* — Michael P LaPage
(74) *Attorney, Agent, or Firm* — Bret E. Field; BOZICEVIC, FIELD & FRANCIS LLP

(57) ABSTRACT

Aspects of the present disclosure include a particle sorter with a droplet deflector configured to apply a known offset deflection force to a droplet stream. Particle sorters according to certain embodiments include a flow cell, a light source, e.g., laser, for irradiating an interrogation point of the flow cell, a detector for detecting light from the interrogation point, a droplet generator for producing a droplet stream from fluid exiting the flow cell and a droplet deflector configured to apply a known offset deflection force to the droplet stream. In some cases, the droplet deflector comprises first and second plates configured to be offset from one another. Methods and particle sorting modules for applying a known offset deflection force are also provided.

23 Claims, 7 Drawing Sheets

(56) References Cited

U.S. PATENT DOCUMENTS

| | | | |
|---|---|---|---|
| 5,483,469 A | 1/1996 | Van Den Engh et al. | |
| 5,489,929 A * | 2/1996 | Vago | B41J 2/115 |
| | | | 347/76 |
| 6,079,836 A | 6/2000 | Burr et al. | |
| 2011/0033339 A1 | 2/2011 | Muraki et al. | |
| 2011/0269175 A1 | 11/2011 | Durack et al. | |
| 2011/0284378 A1 | 11/2011 | Shinoda | |
| 2013/0340539 A1* | 12/2013 | Gaskill-Fox | G01N 15/14 |
| | | | 73/864.91 |
| 2014/0144817 A1* | 5/2014 | Hashimoto | G01N 15/1425 |
| | | | 209/552 |
| 2014/0170697 A1 | 6/2014 | Sharpe et al. | |
| 2014/0309795 A1* | 10/2014 | Norton | G01N 15/1459 |
| | | | 700/282 |
| 2015/0050638 A1* | 2/2015 | Marquette | G01N 15/1012 |
| | | | 435/286.1 |
| 2017/0299493 A1 | 10/2017 | Norton | |
| 2017/0307502 A1 | 10/2017 | Mason et al. | |
| 2017/0327783 A1 | 11/2017 | Grummitt et al. | |
| 2018/0095022 A1 | 4/2018 | Petersen | |
| 2020/0057364 A1* | 2/2020 | Liao | H05G 2/005 |

* cited by examiner

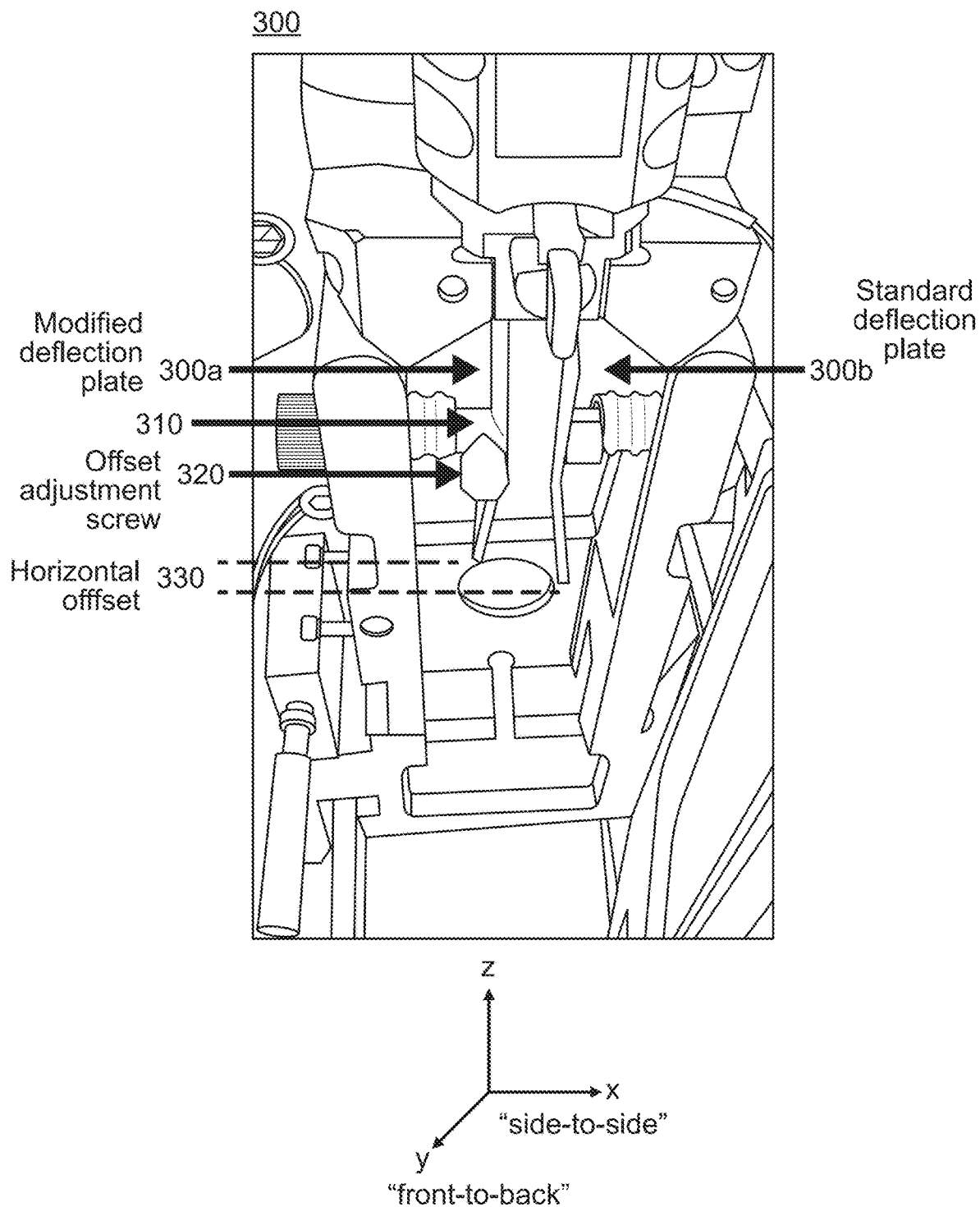

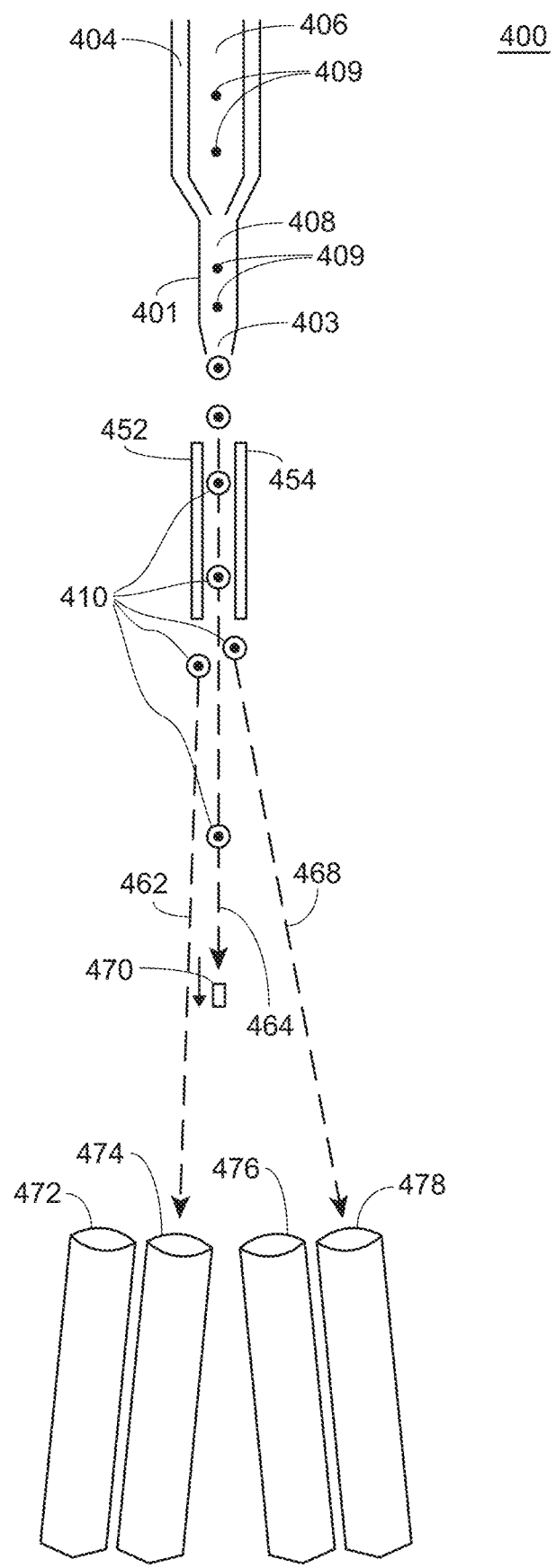

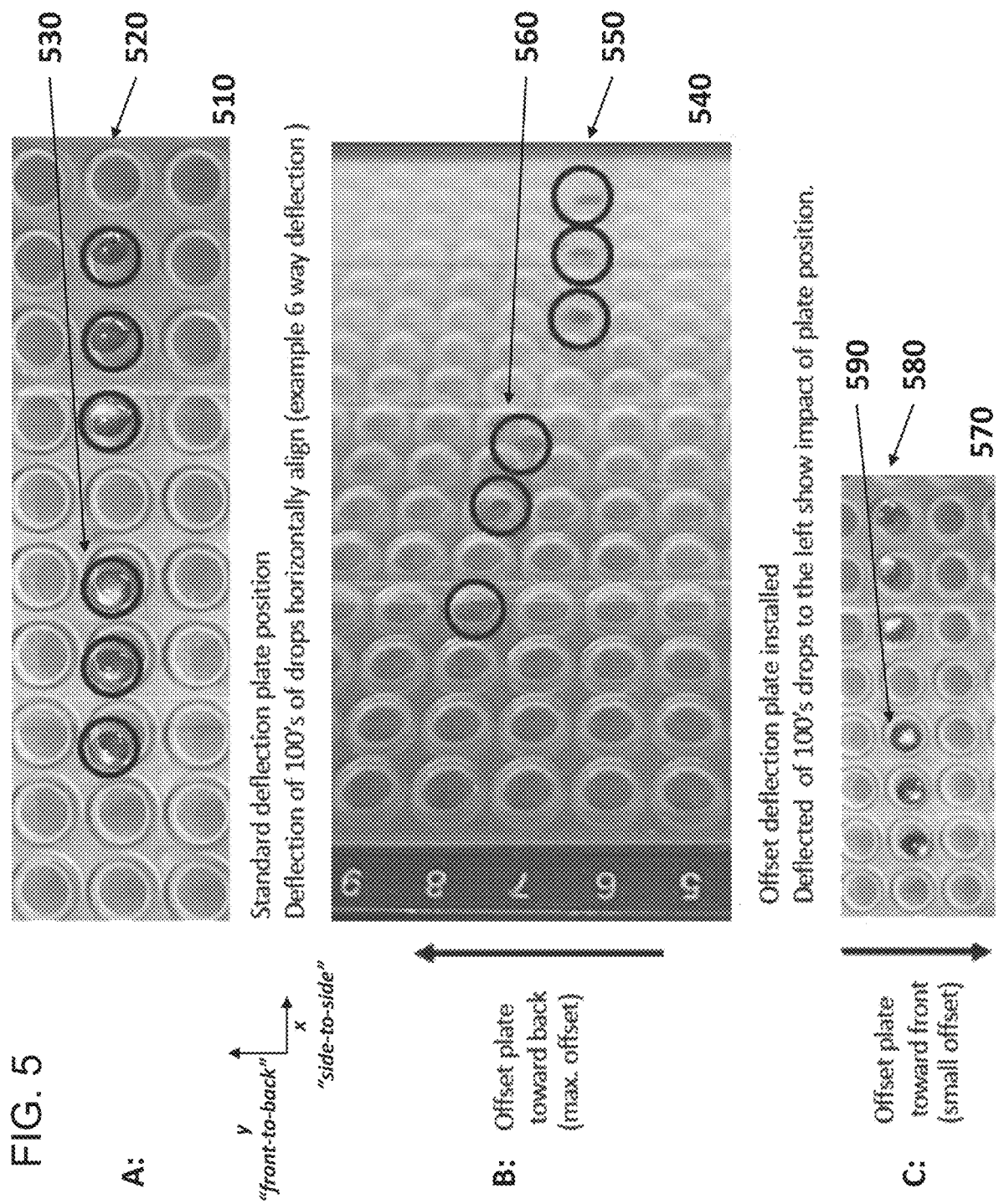

FLOW CYTOMETER WITH ADJUSTABLE POSITIONAL OFFSET SORT DEFLECTION PLATES AND METHODS OF USING THE SAME

CROSS-REFERENCE

Pursuant to 35 U.S.C. § 119 (e), this application claims priority to the filing date of U.S. Provisional Patent Application Ser. No. 63/041,597 filed Jun. 19, 2020, the disclosure of which application is incorporated herein by reference in its entirety.

INTRODUCTION

Flow-type particle sorting systems, such as sorting flow cytometers, are used to sort particles in a fluid sample based on at least one measured characteristic of the particles. In a flow-type particle sorting system, particles, such as molecules, analyte-bound beads, or individual cells, in a fluid suspension are passed in a stream by a detection region in which a sensor detects particles contained in the stream of the type to be sorted. The sensor, upon detecting a particle of the type to be sorted, triggers a sorting mechanism that selectively isolates the particle of interest. Sorted particles of interest are isolated into partitions, such as, for example, sample containers, test tubes or wells of a multi-well plate.

Particle sensing typically is carried out by passing the fluid stream by a detection region in which the particles are exposed to irradiating light, from one or more lasers, and the light scattering and fluorescence properties of the particles are measured. Particles or components thereof can be labeled with fluorescent dyes to facilitate detection, and a multiplicity of different particles or components may be simultaneously detected by using spectrally distinct fluorescent dyes to label the different particles or components. Detection is carried out using one or more photosensors to facilitate the independent measurement of the fluorescence of each distinct fluorescent dye.

To sort particles in the sample, a drop charging mechanism charges droplets of the flow stream containing a particle type to be sorted with an electrical charge at the break-off point of the flow stream. Droplets are passed through an electrostatic field and are deflected based on polarity and magnitude of charge on the droplet into one or more partitions, such as sample collection containers. Uncharged droplets are not deflected by the electrostatic field and are collected by a receptacle along the longitudinal axis of the flow stream.

SUMMARY

Aspects of the present disclosure include particle sorters with a droplet deflector configured to apply a known offset deflection force to a droplet stream. Particle sorters according to certain embodiments include a flow cell, a light source, e.g., laser, for irradiating an interrogation point of the flow cell, a detector for detecting light from the interrogation point, a droplet generator for producing a droplet stream from fluid exiting the flow cell and a droplet deflector configured to apply a known offset deflection force to the droplet stream.

Particle sorters according to certain embodiments include droplet deflectors with first and second plates configured to be offset from one another. In embodiments, the first and second plates of the droplet deflector are configured to be adjustably offset from one another. In some embodiments, the first and second plates are configured to be adjustably offset from one another with respect to a horizontal plane. In such embodiments, the horizontal plane may be perpendicular to the axis of the droplet stream. In some instances, the first plate comprises an elongated section configured to allow the first plate to be adjustably offset from the second plate with respect to the horizontal plane. In certain instances, the elongated section of the first plate comprises a set screw configured to allow the first plate to be adjustably offset from the second plate with respect to the horizontal plane.

In some examples, the first and second plates are configured to be adjustably offset from each other by greater than 0 mm to 5 mm or more. In other examples, the first and second plates are configured to be adjustably offset from each other in increments determined by the thread pitch of a set screw used to adjust the offset.

In certain embodiments, the known offset deflection force is sufficient to offset a drop deposition position by 2 mm or more (for example, when such offset is measured at a distance of 140 mm below the lowest point of the first deflection plate). In some instances, the known offset deflection force is sufficient to offset a drop deposition position by one droplet diameter or less (for example, when such offset is measured at a distance of 140 mm below the lowest point of the first deflection plate).

In embodiments, the particle sorter may further comprise a plurality of partitions configured to receive droplets deflected by the droplet deflector. In some embodiments, the partitions comprise a collection container. In instances, the collection container is a multi-well plate. In some cases, the multi-well plate contains 1536 or fewer wells. In some instances, the partitions comprise collection tubes. In examples, the diameter of each partition is 1.8 mm or less.

In embodiments, the first and second plates are configured to be parallel to one another. In some embodiments, the first and second plates are configured to be adjustably rotated to face one another.

In certain embodiments, the second plate comprises an elongated section configured to allow the second plate to be adjustably offset from the first plate with respect to the horizontal plane. In some cases, the elongated section of the second plate comprises a set screw configured to allow the second plate to be adjustably offset from the first plate with respect to the horizontal plane.

In embodiments, the droplet deflector may include an actuator, e.g., a motor, configured to adjust the offset between the first and second plates. In some embodiments, the actuator, e.g., motor, is operably linked to a feedback subsystem. In instances, the feedback subsystem comprises a controller operably connected to the actuator, e.g., motor, and to a detector configured to detect a distance a droplet of the droplet stream is offset. In some instances, the feedback subsystem is configured to iteratively adjust the offset between the first and second plates.

In some embodiments, the first and second plates are metallic. In examples, the metallic plates are spaced apart by 1 mm or more. In other examples, the metallic plates are spaced apart by 3 mm or more. In some cases, the first and second plates are rectangular.

Methods for deflecting droplets with a known offset deflection force are also provided. Methods according to certain embodiments include irradiating with a light source an interrogation point of a flow cell, detecting light from the interrogation point with a detector, producing a droplet stream from fluid exiting the flow cell with a droplet generator, and deflecting droplets of the droplet stream with a droplet deflector configured to apply a known offset deflection force to the droplet stream.

Aspects of the present disclosure also include particle sorting modules configured to apply a known offset droplet deflection force. Particle sorting modules according to certain embodiments include a droplet deflector configured to apply a known offset deflection force to the droplet stream. In some embodiments, the droplet deflector comprises first and second plates configured to be offset from one another.

Embodiments of the invention solve the problem of lack of ability to make fine adjustments to drop deposition position in the horizontal plane, closer to, or away from the stream position, which exists in current flow sorters. Embodiments of the invention provide for positioning of drops for 1536 well microplates, and for positioning adjustments for small collection tubes or other containers. Embodiments of the invention address the problem on sort collection devices that are rectangular and do not sit at exact right angles to the horizontal plane of the sort defection streams.

BRIEF DESCRIPTION OF THE FIGURES

The invention may be best understood from the following detailed description when read in conjunction with the accompanying drawings. Included in the drawings are the following figures:

FIG. 3 depicts a particle sorter according to an embodiment of the present disclosure comprising an offset between first and second plates in the "front-to-back" axis of a horizontal plane.

FIG. 4B depicts a schematic drawing of a particle sorter according to certain embodiments.

FIG. 5 depicts the effect of applying a known offset deflection force to droplets of a droplet stream in an embodiment of a particle sorter according to the present disclosure by showing the droplet deposition positions when applying deflection forces with varying degrees of a known offset.

DETAILED DESCRIPTION

Figure 1:
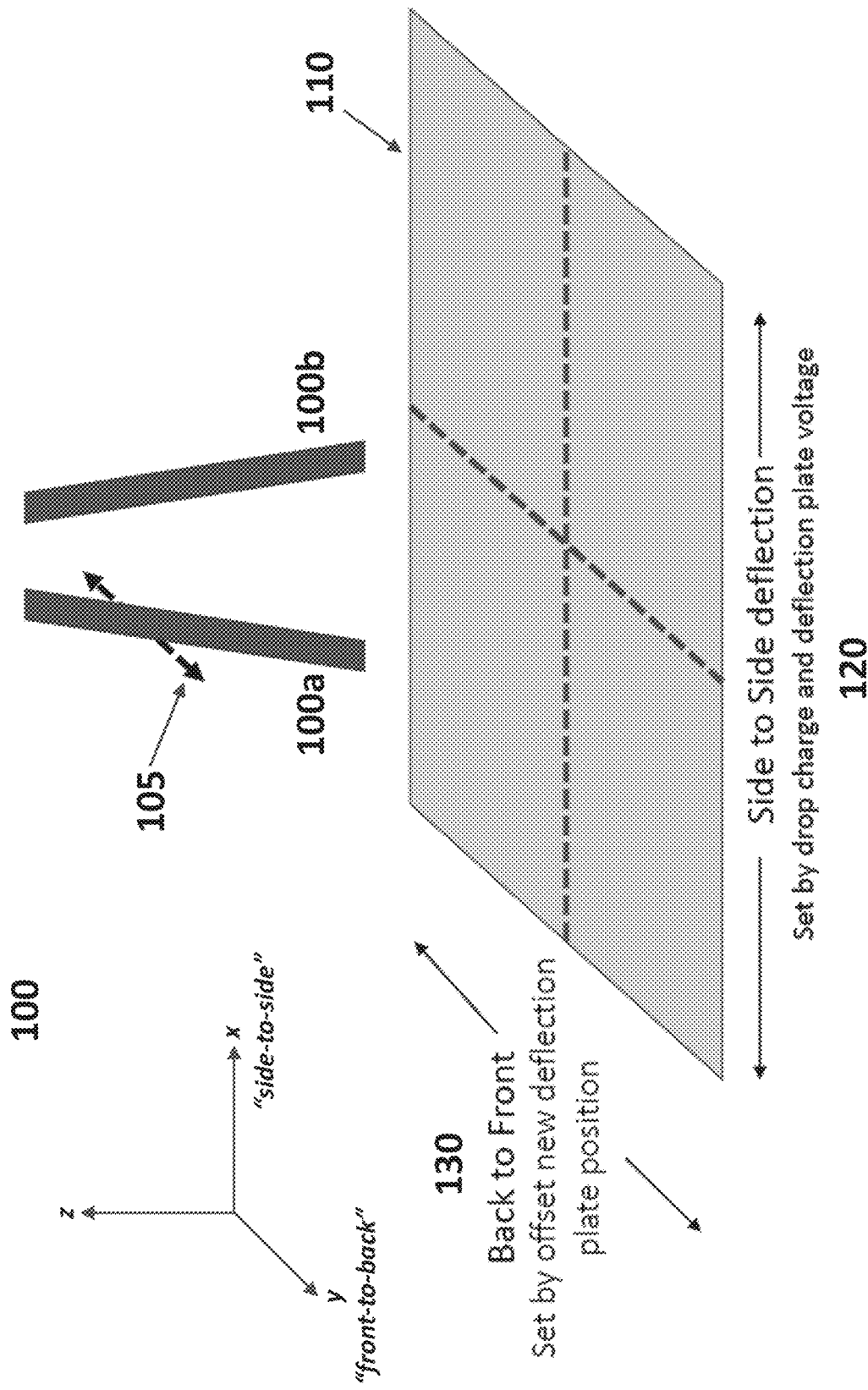
FIG. 1 depicts a schematic droplet deflector of a particle sorter according to the present disclosure.

Aspects of the present disclosure include a particle sorter with a droplet deflector configured to apply a known offset deflection force to a droplet stream. Particle sorters according to certain embodiments include a flow cell, a light source, e.g., laser, for irradiating an interrogation point of the flow cell, a detector for detecting light from the interrogation point, a droplet generator for producing a droplet stream from fluid exiting the flow cell and a droplet deflector configured to apply a known offset deflection force to the droplet stream. Methods and particle sorting modules for applying a known offset deflection force are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides a particle sorter comprising a droplet deflector configured to apply a known offset deflection force to a droplet stream. In further describing embodiments of the disclosure, particle sorters with first and second plates configured to be offset from one another, with adjustable plates, with partitions configured to receive deflected droplets and configured to be adjusted by an actuator, e.g., a motor, and feedback subsystem are first described in greater detail. Next, methods for deflecting droplets with a known offset deflection force are described. Particle sorting modules are also described.

Particle Sorters

Aspects of the present disclosure include particle sorters with a droplet deflector configured to apply a known offset deflection force to a droplet stream. In particular, particle sorters according to certain embodiments include a flow cell, a light source, e.g., laser, for irradiating an interrogation point of the flow cell, a detector for detecting light from the interrogation point, a droplet generator for producing a droplet stream from fluid exiting the flow cell and a droplet deflector configured to apply a known offset deflection force to the droplet stream.

The term "deflect" is used herein in its conventional sense to refer to applying a force which diverts droplets in a droplet stream from flowing along their normal trajectory (i.e., in the absence of the deflection force) to a different trajectory.

By applying an "offset deflection force," it is meant applying a deflection force to droplets of a droplet stream that is offset from a standard side-to-side oriented direction (i.e., in a direction that is different than the direction from which the deflection force would be applied absent the offset). That is, the deflection force may be askew with reference to the direction of the deflection force prior to applying the offset. For example, the orientation at which a deflection force is applied to droplets of a droplet stream may be offset in a horizontal plane that is orthogonal to the longitudinal axis of the droplet stream. As such, in the absence of offsetting the deflection force, the deflection force would be applied to the droplet stream exclusively in a "side-to-side" direction within a horizontal plane. Upon offsetting the deflection force, the deflection force may then comprise both a "side-to-side" component and a "front-to-back" component. That is, if an x-y-z coordinate system were overlaid onto a droplet deflector, a standard droplet deflector would apply a deflection force exclusively along the x-axis of the coordinate system. In contrast, a droplet deflector configured to apply a known offset deflection force would apply a deflection force with directional components in both the x-axis and the y-axis. In some cases, the deflection force is offset by applying the deflection force after rotating the orientation at which the deflection force is applied to the droplet stream around the longitudinal axis of the droplet stream.

By applying a "known offset deflection force," it is meant applying a deflection force to droplets of a droplet stream that is offset by an amount that is by design or predetermined. That is, in some cases, a "known offset deflection force" is a deflection force that is offset by an intended amount.

As described in greater detail herein, the subject particle sorters according to certain embodiments provide for a droplet deflector comprising first and second plates configured to be offset from one another. In other embodiments, the subject particle sorters according to certain embodiments provide for first and second plates configured to be adjustably offset from one another. Sorting particles, such as cells, by employing the subject particle sorters configured to apply a known offset deflection force to a droplet stream results in increased sorting efficiency, such that fewer particles of a sample are wasted (e.g., by inadvertently deflecting droplets containing target particles, such as cells, into unintended locations, such as a location other than the intended well of a multi-well plate) when sorting a sample. In some cases, the efficiency of sorting may be improved such that more variations of particles or a larger number of particles corresponding to each type of sorted particle may be collected and sorted when the subject particle sorters and methods are employed. When used as part of flow cytometrically sorting a sample, the subject methods can improve the yield of particle sorting.

In embodiments of particle sorters according to the present disclosure, droplets in the droplet stream may be diverted from their normal trajectory along the longitudinal axis of the droplet stream by a known offset deflection force by a distance by 0.001 mm or more as measured radially across a plane orthogonal to the longitudinal axis of the droplet stream (such that such radial measurement reflects the known offset—i.e., is comprised of both x-axis and y-axis components with respect to an overlaid x-y-z plane), such as 0.005 mm or more, such as 0.01 mm or more, such as 0.05 mm or more, such as 0.1 mm or more, such as 0.5 mm or more, such as 1 mm or more, such as 2 mm or more, such as 5 mm or more, such as 10 mm or more, such as 15 mm or more, such as 20 mm or more, such as 25 mm or more, such as 30 mm or more, such as 35 mm or more and including 50 mm or more. For example, the droplets in the droplet stream may be diverted by a distance of from 0.001 mm to 100 mm, such as from 0.005 mm to 95 mm, such as from 0.001 mm to 90 mm, such as from 0.05 mm to 85 mm, such as from 0.01 mm to 80 mm, such as from 0.05 mm to 75 mm, such as from 0.1 mm to 70 mm, such as from 0.5 mm to 65 mm, such as from 1 mm to 60 mm, such as from 5 mm to 55 mm and including from 10 mm to 50 mm.

Particle sorters according to embodiments of the present disclosure may be configured for sorting particles in a sample, such as cells in a biological sample. In these embodiments, the droplet deflector of the particle sorter is configured to apply a known offset deflection force sufficient to deflect droplets into one or more sample collection containers. Accordingly, the droplet deflector may be configured to apply a known offset deflection force such that droplets are deflected into sample collection containers that are 0.001 mm or more from the longitudinal axis of the droplet stream, such as by 0.005 mm or more, such as 0.01 mm or more, such as 0.05 mm or more, such as 0.1 mm or more, such as 0.5 mm or more, such as 1 mm or more, such as 2 mm or more, such as 5 mm or more, such as 10 mm or more, such as 15 mm or more, such as 20 mm or more, such as 25 mm or more, such as 30 mm or more, such as 35 mm or more and including 50 mm or more. For example, droplet deflectors may be configured to deflect droplets into sample collection containers that are diverted from the longitudinal axis of the flow stream by a distance of from 0.001 mm to 100 mm, such as from 0.005 mm to 95 mm, such as from 0.001 mm to 90 mm, such as from 0.05 mm to 85 mm, such as from 0.01 mm to 80 mm, such as from 0.05 mm to 75 mm, such as from 0.1 mm to 70 mm, such as from 0.5 mm to 65 mm, such as from 1 mm 60 mm, such as from 5 mm to 55 mm and including from 10 mm to 50 mm.

As described above, particle sorters according to embodiments comprise droplet deflectors configured to deflect droplets in a flow stream by applying a known offset deflection force to the droplet stream. In some cases, the different offsets of the present disclosure can be described based on the angle formed between the direction in which the deflection force is applied and the line representing the intersection of a horizontal plane and a plate of a droplet deflector. Such angles describing the offset deflection force may vary depending on the structural configuration of the subject droplet deflector of the particle sorter, as described in greater detail below, and may range from 0.01° to 90°, such as from 0.05° to 85°, such as from 0.1° to 80°, such as from 0.5° to 75°, such as from 10° to 70°, such as from 15° to 65°, such as from 20° to 60°, such as from 25° to 55° and including from 30° to 50°. In other cases, the different known offset deflection forces of the present disclosure can be described based on the degree to which the orientation of the deflection force is rotated around the longitudinal axis of the droplet stream prior to applying the known offset deflection force. Such rotation angle describing the known offset deflection force may vary depending on the structural configuration of the subject droplet deflector of the particle sorter and may range from 0.01° to 360°, such as from 0.05° to 355°, such as from 0.1° to 350°, such as from 0.5° to 300°, such as from 10° to 270°, such as from 15° to 135°, such as from 20° to 90°, such as from 25° to 75° and including from 30° to 50°.

In embodiments of the present disclosure, the droplet deflector comprises first and second plates configured to be offset from one another. By offsetting first and second plates from one another, it is meant, in some cases, that upon offsetting the plates, the plates no longer directly and immediately face one another with the droplet stream still positioned midway between the two plates. In other words, the face of the plates are no longer horizontally opposed in the Y axis plane. In some cases, the plates have been offset by moving one plate along a "front-to-back" axis (i.e., y-axis), as described above. In some cases, the different offsets of the first and second plates of the present disclosure can be described based on the distance a plate is offset in the "front-to-back" axis (i.e., y-axis). Such distance describing the offset between the plates may vary depending on the structural configuration of the subject droplet deflector of the particle sorter and may range from 0.01 mm to 10 mm or more, such as from 0.05 mm to 9.9 mm, such as from 0.1 mm to 9 mm, such as from 0.5 mm to 7.5 mm, such as from 0.1 mm to 6 mm, such as from 1.5 mm to 5 mm, such as from 2 mm to 4 mm and including from 2.5 mm to 3.5 mm. In some cases, the different offsets of the first and second plates of the present disclosure can be described by the angle formed between the line connecting the midpoint of the first plate with the midpoint of the second plate when the plates directly and immediately face one another (i.e., prior to offsetting the first and second plates) and the line formed between the midpoint of the first plate with the midpoint of the second plate after offsetting the plates from one another. Such angle describing the offset between the plates may vary depending on the structural configuration of the subject droplet deflector of the particle sorter, as described in greater detail below, and may range from 0.01° to 90°, such as from 0.05° to 85°, such as from 0.1° to 80°, such as from 0.5° to 75°, such as from 10° to 70°, such as from 15° to 65°, such as from 20° to 60°, such as from 25° to 55° and including from 30° to 50°.

In some cases, the first and second plates are configured to be adjustably offset from one another. By adjustably offset from one another, it is meant that the amount of the offset between the first and second plates is dynamically configurable. In such cases, the first and second plates may be adjusted to increase or decrease the offset between the first and second plates as desired. In such cases, the offset may be adjusted repeatedly in order to iterate through a range of offsets and in so doing, empirically converge on a desired offset.

As described above, in some embodiments the first and second plates are configured to be adjustably offset from one another with respect to a horizontal plane. The horizontal plane may be parallel to the plane in which collection containers that receive droplets reside—i.e., the plane of a multi-well plate. In some cases, the horizontal plane is perpendicular to the longitudinal axis of the droplet stream. By perpendicular to the longitudinal axis of the droplet stream, it is meant that the horizontal plane is orthogonal to the longitudinal axis of the droplet stream. By longitudinal axis of the droplet stream, it is meant the axis along which droplets of the droplet stream flow when not influenced by a deflection force.

FIG. 1 depicts a schematic droplet deflector of a particle sorter according to the present disclosure. Droplet deflector 100 includes a first plate 100a and a second plate 100b. The first plate 100a and second plate 100b of the droplet deflector 100 are configured to be adjustably offset from one another. In the embodiment shown, the offset is indicated by the available offset positions of the first plate 100a along the dotted line 105. The first plate 100a and second plate 100b are configured to be adjustably offset from one another with respect to a horizontal plane 110 shown below the first plate 100a and second plate 100b. The horizontal plane 110 is spanned by a "side-to-side" axis (i.e., x-axis) 120 and a "front-to-back" axis (i.e., y-axis) 130. In some embodiments, the drop deposition position of a droplet along the "side-to-side" axis 120 can be determined by, for example, the charge applied to the droplet and the voltage applied to the first plate 100a and second plate 100b. In embodiments, the drop deposition position of a droplet along the "front-to-back" axis 130—i.e., the degree to which the drop deposition position is offset—can be determined by, for example, the amount the first plate 100a is offset along the available offset positions shown by the dotted line 105. In some instances, velocity may be employed to modulate the degree of deflection. For example, at lower stream velocities, drops spend longer periods of time within the deflection field of the plates thus increasing the influence of the field and increasing the deflection. In such instances, lower velocities may be employed to achieve greater deflection with a given plate configuration.

In embodiments, the first plate may comprise an elongated section configured to allow the first plate to be adjustably offset from the second plate with respect to the horizontal plane. The elongated section may be any convenient configuration of the first plate that enables the first plate to be adjustably offset from the second plate. In embodiments, the elongated section may refer to a section that is elongated along the length of the available offset positions of the first plate. That is, the elongated section may be elongated along the "front-to-back" axis (i.e., the y-axis), as described above. In some cases, the elongated section may traverse the length of the available offset positions of the first plate and may limit the movement of the first plate such that the position and orientation of the first plate can only be adjusted along the "front-to-back" axis. In embodiments, the elongated section may be a keyed opening designed to mate with an opposing fixture of the droplet deflector. Such keyed opening may extend along the lateral extent of the available offset positions, such that the first plate is offset by translating the first plate along the length of the keyed opening.

In such embodiments, the elongated section of the first plate may comprise a set screw configured to allow the first plate to be adjustably offset from the second plate with respect to the horizontal plane. The set screw may be any convenient screw and may be positioned in the first plate as needed to adjust the position of the first plate so as to offset it with respect to the second plate. In embodiments, the first plate may include a threaded hole through which the set screw is added such that the end of the set screw protrudes through the threaded hole of the first plate. In some examples, the set screw may be positioned such that rotating the set screw in the first plate causes the first plate to be offset in either a "frontwards" or "backwards" direction along the "front-to-back" axis (i.e., the y-axis). In examples, the set screw may be positioned such that rotating the set screw causes an end of the set screw to apply a force to a fixture of the droplet deflector such that, as a result of applying the force, the first plate is further offset in the "front-to-back" axis. Furthermore, both adjustable plates can have their set screws adjusted fully "in" or fully "out" such that both plates are moved forward or back, without offset to fine adjust the whole electrostatic field that a drop will pass through if that is desired. The set screw may have any convenient length, diameter and thread pitch. In some cases, the set screw may be finely threaded in order to better enable fine adjustments to the offset position of the first plate.

Figure 2:
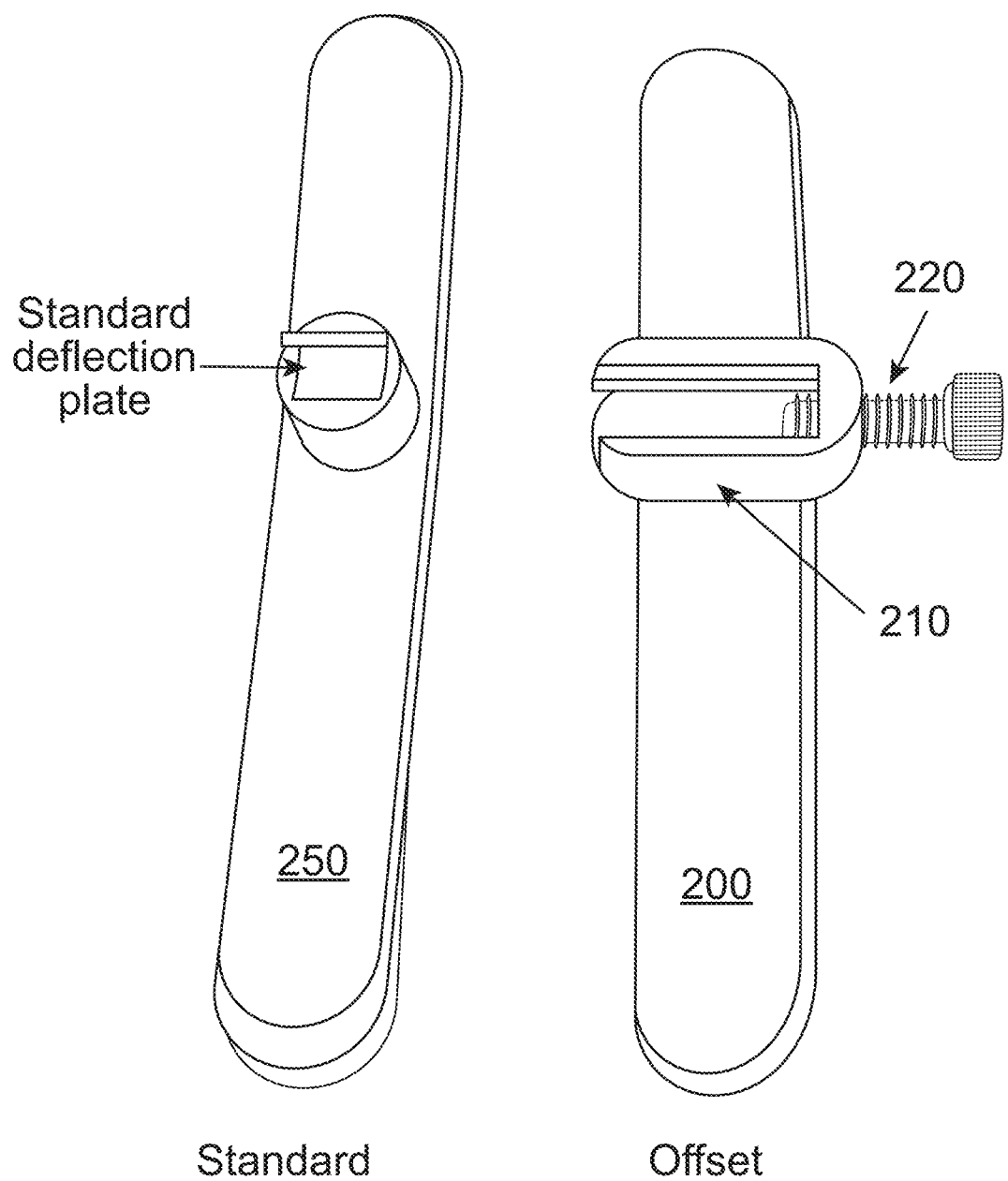
FIG. 2 depicts an embodiment of a first plate according to the present disclosure where the first plate is configured to be adjustably offset from a second plate (Offset from a second plate not shown).

FIG. 2 depicts a first plate 200 according to the present disclosure configured to be adjustably offset. The first plate 200 configured to be adjustably offset according to the present disclosure is illustrated by comparison with a standard plate 250 of a droplet deflector that is not configured to be adjustably offset. The first plate 200 includes an elongated section 210 configured to allow the first plate 200 to be adjustably offset from a second plate with respect to a horizontal plane, as described above. The elongated section 210 of the first plate 200 also includes a set screw 220 configured to allow the first plate to be adjustably offset from the second plate with respect to the horizontal plane, as described above.

In embodiments of the particle sorter of the present disclosure, the first and second plates may be configured to be adjustably offset from each other by greater than 0 mm to 5 mm or more, such as from 0.01 mm to 4.99 mm, such as from 0.05 mm to 4 mm, such as from 0.5 mm to 3.5 mm, such as from 1 mm to 3 mm, and including 1.5 mm to 2.5 mm. In such embodiments, the first plate and the second plate may be configured to adjustably offset from each other in increments that are determined by the thread pitch of a set screw used to adjust the offset between the first and second plates. In instances where the set screw includes finely threaded pitch, the first plate and the second plate may be capable of adjustments that are finer than the increments of adjustment available when the set screw includes a less finely threaded pitch. As described above, the first and second plates may be adjustably offset from one another in different increments with respect to a horizontal plane. In some cases, the first plate may include an elongated section and a set screw configured to adjustably offset the first plate from the second plate by offset amounts and increments as described above.

FIG. 3 depicts a particle sorter according to an embodiment of the present disclosure comprising an offset between first and second plates in the "front-to-back" axis (i.e., y-axis) of a horizontal plane, as described above. Particle sorter 300 according to an embodiment of the present disclosure includes a first deflection plate 300a, which includes an elongated section 310 and a set screw 320 and is configured to be adjustably offset from a second plate 300b, which is a standard deflection plate (i.e., it is not configured to be adjustably offset according to the present disclosure). The "front-to-back" offset between the first 300a and second plates 300b is depicted as the horizontal space between dotted lines 330. The horizontal offset 330 between the first and second plates illustrates how the first plate is offset in the backwards direction of the horizontal plane such that the resulting deflection force is a known offset deflection force, i.e., it includes a known offset in the "front-to-back" direction.

In some embodiments, the known offset deflection force is sufficient to offset a drop deposition position by 2 mm or more. For example, a droplet may be offset in the "front-to-back" axis by 2 mm or more when measured at a distance, such as, for example, a distance of 140 mm, below the lowest point of the first plate. That is, when measured at a distance of 140 mm below the lowest point of the first plate of the droplet deflector, the droplet deflector may be configured to apply a known offset deflection force sufficient to deflect a droplet of the droplet stream by an offset of 2 mm or more in the "front-to-back" axis of a horizontal plane. As such, the resulting offset amount of the droplet deposition position can be offset by 2 mm or more when measured at 140 mm below the lowest point of the first plate. In other embodiments, the known offset deflection force is sufficient to offset a drop deposition position by one droplet diameter or less. That is, when measured at a distance below the lowest point of the first plate of the droplet deflector, the droplet deflector may be configured to apply a known offset deflection force to deflect a droplet of the droplet stream by an offset of only one droplet diameter or less in the "front-to-back" axis of a horizontal plane. As such, the resulting offset amount of the droplet deposition position can be offset by only one droplet diameter or less when measured at a distance below the lowest point of the first plate.

In embodiments of the particle sorter according to the present disclosure, the droplet deflector of the particle sorter is configured such that the first and second plates are metallic. The metallic plates of the subject particle sorters may be formed from any suitable metal capable of producing an electric field and may include but is not limited to aluminum, brass, chromium, cobalt, copper, gold, indium, iron, lead, nickel, platinum, palladium, tin, steel (e.g., stainless steel), silver, zinc and combinations and alloys thereof, such as for example an aluminum alloy, aluminum-lithium alloy, an aluminum-nickel-copper alloy, an aluminum-copper alloy, an aluminum-magnesium alloy, an aluminum-magnesium oxide alloy, an aluminum-silicon alloy, an aluminum-magnesium-manganese-platinum alloy, a cobalt alloy, a cobalt-chromium alloy, a cobalt-tungsten alloy, a cobalt-molybdenum-carbon alloy, a cobalt-chromium-nickel-molybdenum-iron-tungsten alloy, a copper alloy, a copper-arsenic alloy, a copper-berrylium alloy, a copper-silver alloy, a copper-zinc alloy (e.g., brass), a copper-tin alloy (e.g., bronze), a copper-nickel alloy, a copper-tungsten alloy, a copper-gold-silver alloy, a copper-nickel-iron alloy, a copper-manganese-tin alloy, a copper-aluminum-zinc-tin alloy, a copper-gold alloy, a gold alloy, a gold-silver alloy, an indium alloy, an indium-tin alloy, an indium-tin oxide alloy, an iron alloy, an iron-chromium alloy (e.g., steel), an iron-chromium-nickel alloy (e.g., stainless steel), an iron-silicon alloy, an iron-chromium-molybdenum alloy, an iron-carbon alloy, an iron-boron alloy, an iron-magnesium alloy, an iron-manganese alloy, an iron molybdenum alloy, an iron-nickel alloy, an iron-phosphorus alloy, an iron-titanium alloy, an iron-vanadium alloy, a lead alloy, a lead-antimony alloy, a lead-copper alloy, a lead-tin alloy, a lead-tin-antimony alloy, a nickel alloy, a nickel-manganese-aluminum-silicon alloy, a nickel-chromium alloy, a nickel-copper alloy, a nickel, molybdenum-chromium-tungsten alloy, a nickel-copper-iron-manganese alloy, a nickel-carbon alloy, a nickel-chromium-iron alloy, a nickel-silicon alloy, a nickel-titanium alloy, a silver alloy, a silver-copper alloy (e.g., sterling silver) a silver-coper-germanium alloy (e.g., Argentium sterling silver), a silver-gold alloy, a silver-copper-gold alloy, a silver-platinum alloy, a tin alloy, a tin-copper-antimony alloy, a tin-lead-copper alloy, a tin-lead-antimony alloy, a titanium alloy, a titanium-vanadium-chromium alloy, a titanium-aluminum alloy, a titanium-aluminum-vanadium alloy, a zinc alloy, a zinc-copper alloy, a zinc-aluminum-magnesium-copper alloy, a zirconium alloy, a zirconium-tin alloy or a combination thereof.

In embodiments of the present disclosure, a known offset deflection force is applied to droplets in the droplet stream by applying a voltage to the first and second metallic plates of the droplet deflector resulting in an electric field between the first and second metallic plates. Such electric field between the first and second plates accelerates and diverts the trajectory of charged target droplets from the longitudinal axis of the droplet stream. In such embodiments, the known offset deflection force resulting from the electric field may accelerate and divert the trajectory of target droplets from the longitudinal axis of the droplet stream to one or more sample collection containers. The voltage applied to the first and second plates to divert charged droplets as described above may be 10 mV or more, such as 25 mV or more, such as 50 mV or more, such as 100 mV or more, such as 250 mV or more, such as 500 mV or more, such as 750 mV or more, such as 1000 mV or more, such as 2500 mV or more, such as 5000 mV or more, such as 10000 V or more, such as 15000 V or more, such as 25000 V or more, such as 50000 V or more and including 100000 V or more. In certain embodiments, the voltage applied to the first and second metallic plates is from 0.5 kV to kV, such as from 1 kV to 15 kV, such as from 1.5 kV to 12.5 kV and including from 2 kV to 10 kV. In certain embodiments, the voltage applied to the first and second metallic plates is from 0.5 kV to 15 kV, such as from 1 kV to 15 kV, such as from 1.5 kV to 12.5 kV and including from 2 kV to 10 kV. Depending on the voltage applied to the first and second metallic plates, the electric field strength between the metallic plates may vary, ranging from 0.001 V/m to $1\times10^7$ V/m, such as from 0.01 V/m to $5\times10^6$ V/m, such as from 0.1 V/m to $1\times10^6$ V/m, such as from 0.5 V/m to $5\times10^5$, such as from 1 V/m to $1\times10^5$ V/m, such as from 5 V/m to $5\times10^4$ V/m, such as from 10 V/m to $1\times10^4$ V/m and including from 50 V/m to $5\times10^3$ V/m, for example $1\times10^5$ V/m to $2\times10^6$ V/n.

The first and second metallic plates are spaced apart from each other by a distance sufficient to generate an electric field therebetween. For example, the first and second metallic plates may be spaced apart by 0.01 mm or more, such as 0.05 mm or more, such as 0.1 mm or more, such as 0.5 mm or more, such, as 1 mm or more, such as 1.5 mm or more, such as 2 mm or more, such as 2.5 mm or more, such as 3 mm or more, such as 3.5 mm or more, such as 4 mm or more, such as 4.5 mm or more, such as 5 mm or more, such as 10 mm or more, such as 15 mm or more, such as 20 mm or more and including 25 mm or more. In some instances, the first and second metallic plates are spaced apart by a distance that ranges from 0.01 mm to 50 mm, such as from 0.05 mm to 45 mm, such as from 0.1 mm to 40 mm, such as from 0.5 mm to 35 mm, such as from 1 mm to 30 mm, such as from 1.5 mm to 25 mm, such as from 2 mm to 20 mm and including from 3 mm to 15 mm.

In some embodiments of the particle sorter, the first and second plates of the droplet deflector are configured to be parallel to one another. That is, even when the first plate and second plates are offset from one another, the plane of the first plate is parallel to the plane of the second plate. In some instances, the first and second plates are configured to be adjustably rotated to face one another. That is, in instances where the offset between the first and second plates can be adjusted, the orientation of the first and second plates can also be adjusted so that the first and second plates remain parallel to each other at various degrees of offset from one another. In some cases, either the first plate or the second plate or both plates are rotated about their respective longitudinal axes (in some cases parallel to the longitudinal axis of the droplet stream) in order to be oriented as facing each other.

In embodiments, the second plate of the droplet deflector of the particle sorter comprises an elongated section configured to allow the second plate to be adjustably offset from the first plate with respect to the horizontal plane. The elongated section may be any convenient configuration of the second plate that enables the second plate to be adjustably offset from the first plate. In embodiments, the elongated section may refer to a section that is elongated along the length of the available offset positions of the second plate. That is, the elongated section may be elongated along the "front-to-back" axis, as described above. In some cases, the elongated section may traverse the length of the available offset positions of the second plate and may limit the movement of the second plate such that the position and orientation of the second plate can only be adjusted along the "front-to-back" axis. In embodiments, the elongated section may be a keyed opening designed to mate with an opposing fixture of the droplet deflector of the particle sorter. Such keyed opening may extend along the lateral extent of the available offset positions, such that the second plate is offset by translating the second plate along the length of the keyed opening. In such embodiments, the elongated section of the second plate may comprise a set screw configured to allow the second plate to be adjustably offset from the first plate with respect to the horizontal plane. The set screw may be any convenient set screw and may be positioned in the second plate as needed to adjust the position of the second plate so as to offset it with respect to the first plate in the horizontal plane. In embodiments, the second plate may include a threaded hole through which the set screw is added such that the end of the set screw protrudes through the threaded hole of the second plate. In some examples, the set screw may be positioned such that rotating the set screw in the second plate causes the second plate to be offset in either a "frontwards" or "backwards" direction along the "front-to-back" axis. In examples, the set screw may be positioned such that rotating the set screw causes an end of the set screw to apply a force to a stationary fixture of the droplet deflector such that, as a result of applying the force, the second plate is further offset along the "front-to-back" axis. The set screw may have any convenient length, diameter and thread pitch. In some cases, the set screw may be finely threaded in order to better enable fine adjustments to the offset position of the second plate.

In instances, the particle sorter according to the present disclosure may be configured to further comprise an actuator, e.g., a motor, that is configured to adjust the offset between the first and second plates. Where the actuator is a motor, the motor may be integrated into the droplet deflector of the particle sorter in any convenient manner such that the motor is capable of automatically adjusting the offset between the first and second plates. In some cases, the motor may be attached to a set screw directly or indirectly through, for example a gearing mechanism, so that upon rotation of the motor, the set screw is caused to rotate, thereby adjusting the offset between the first and second plates. Any convenient displacement protocol may be employed as a motor configured to adjust the offset between the first and second plates. In some cases, the motor may be configured with an actuated translation stage, leadscrew translation assembly, geared translation device. The motor may comprise a stepper motor, servo motor, brushless electric motor, brushed DC motor, micro-step drive motor, high resolution stepper motor, among other types of motors.

In embodiments, the actuator, e.g., motor, is operably linked to a feedback subsystem. The feedback subsystem may be any convenient system for automatically controlling the amount of an adjustable offset between the first and second plates. In such embodiments, the feedback subsystem may comprise a controller operably connected to the actuator, e.g., motor, and to a detector configured to detect a distance a droplet of the droplet stream is offset. For example, the detector may be configured to detect the distance a droplet is displaced, including the distance the droplet is offset by the particle sorter in the "front-to-back" axis of a horizontal plane, as described above. In instances, the detector may comprise any convenient camera system, such as a camera, configured to capture images of the droplet deposition position, and the controller may be any convenient controller, such as a microcontroller or a microprocessor, configured to evaluate the offset of a droplet based on an image received from the camera and adjust the offset between the first and second plates as needed to refine the offset of the droplet deposition position. That is, in some cases, the controller is configured by instructions stored on a memory operably connected to the controller, which when executed by the controller cause the controller to adjust the amount of offset between the first and second plates. In some examples, the feedback subsystem is configured to iteratively adjust the offset between the first and second plates. That is, the feedback subsystem may be configured to make several adjustments to the offset between the first and second plates such that the known offset deflection force is iteratively adjusted and, correspondingly, the offset of the droplet deposition position is iteratively adjusted. As a result, in some instances, the feedback subsystem may provide additional accuracy with respect to achieving a specific offset of the droplet deposition position. In such embodiments, the feedback subsystem may further be configured to employ calibration particles, e.g., beads, added to the droplet stream in order to detect and measure droplet offsets. Such beads may include, for example, Accudrop Beads, such as BD FACS™ Accudrop Beads.

The first and second plates of the droplet deflector of the subject particle sorters may be any suitable shape, such as a circle, oval, half-circle, crescent-shaped, star-shaped, square, triangle, rhomboid, pentagon, hexagon, heptagon, octagon, rectangle or other suitable polygon. In certain embodiments, the first and second plates are rectangular.

In embodiments, the shape and size of the first plate may be the same or different from the second plate. In some embodiments the shape of the first plate is the same as the second plate (e.g., both rectangular). In other embodiments, the shape of the first plate is different from the second plate (e.g., the first plate is square, and the second plate is rectangular). In some instances, the dimensions of the first plate are the same as the second plate. In one example, the width of the first plate is the same as the second plate. In other instances, the length of the first plate is the same as the second plate. In still other instances, the width and length of the first plate are the same as the width and length of the second plate. In some examples, the dimensions of the first plate are different from the second plate. In one example, the width of the first plate is different from the second plate. In another example, the length of the first plate is different from the second plate. In yet another example, both the width and the length of the first plate is different from the width and the length of the second plate.

Depending on the shape of the first and second plates, the dimensions of the first and second plates may vary. In some embodiments, each of the first and second plates has a width that ranges from 0.5 mm to 10 mm, such as from 1 mm to 9.5 mm, such as from 1.5 mm to 9 mm, such as from 2 mm to 8.5 mm, such as from 2.5 mm to 8 mm, such as from 3 mm to 7.5 mm, such as from 3.5 mm to 7 mm, such as from 4 mm to 6.5 mm and including a width than ranges from 4.5 mm to 6 mm. In some cases, the widths of the first and second plates are the same, and in other cases, the widths of the first and second plates differ. The length of the first and second plates also varies ranging from 10 mm to 500 mm, such as from 15 mm to 450 mm, such as from 20 mm to 400 mm, such as from 25 mm to 350 mm, such as from 30 mm to 300 mm, such as from 35 mm to 250 mm, such as from 40 mm to 200 mm, such as from 45 mm to 150 mm and including from 50 mm to 100 mm. In some cases, the lengths of the first and second plates are the same, and in other cases, the lengths of the first and second plates differ. In certain embodiments, the first and second plates are an asymmetric polygon where a first end has a width that is smaller than the width of the second end. The width at each end may range from 0.01 mm to 10 mm, such as from 0.05 mm to 9.5 mm, such as from 0.1 mm to 9 mm, such as from 0.5 mm to 8.5 mm, such as from 1 mm to 8 mm, such as from 2 mm to 8 mm, such as from 2.5 mm to 7.5 mm and including from 3 mm to 6 mm. In certain embodiments, the first and second plates are asymmetric polygons having a first end having a width from 1 to 10 mm and a second end having a width from 2 to 5 mm. For example, the first and second plates may be asymmetric polygons having a first end having a 5 mm width and a second end having a 10 mm width. In embodiments, the surface area of the first and second plates may vary as desired and may range from 0.25 to 15 cm$^2$, such as 0.5 to 14 cm$^2$, such as 0.75 to 13 cm$^2$, such as 1 to 12 cm$^2$, such as 1.5 to 11 cm$^2$, and including 2 to 10 cm$^2$.

In some embodiments, particle sorters of interest may include one or more sort decision modules configured to generate a sorting decision for a particle, such as a cell, based on identifying the phenotype of the cell. Droplet deflectors may be configured for sorting particles, such as cells, from a flow stream based on the sort decision generated by the sort decision module. As described above, the term "sorting" is used herein in its conventional sense to refer to separating components (e.g., cells, non-cellular particles such as biological macromolecules) of a sample and in some instances delivering the separated components to one or more partitions, such as sample collection containers. For example, the subject particle sorters may be configured for sorting samples having 2 or more components, such as 3 or more components, such as 4 or more components, such as 5 or more components, such as 10 or more components, such as 15 or more components and including sorting a sample having 25 or more components. One or more of the sample components may be separated from the sample and delivered to a sample collection container, such as 2 or more sample components, such as 3 or more sample components, such as 4 or more sample components, such as 5 or more sample components, such as 10 or more sample components and including 15 or more sample components may be separated from the sample and delivered to a sample collection container. In some cases, the phrase "sample components" refers to cells with differing cell phenotypes.

In some embodiments, particle sorting systems of interest are configured to sort particles, such as cells, with an enclosed particle sorting module, such as those described in U.S. Patent Publication No. 2017/0299493, filed on Mar. 28, 2017, the disclosure of which is incorporated herein by reference. In certain embodiments, particles (e.g., cells) of the sample are sorted using a sort decision module having a plurality of sort decision units, such as those described in U.S. Provisional patent application Ser. No. 16/725,756, filed on Dec. 23, 2019, the disclosure of which is incorporated herein by reference.

Figure 4A:
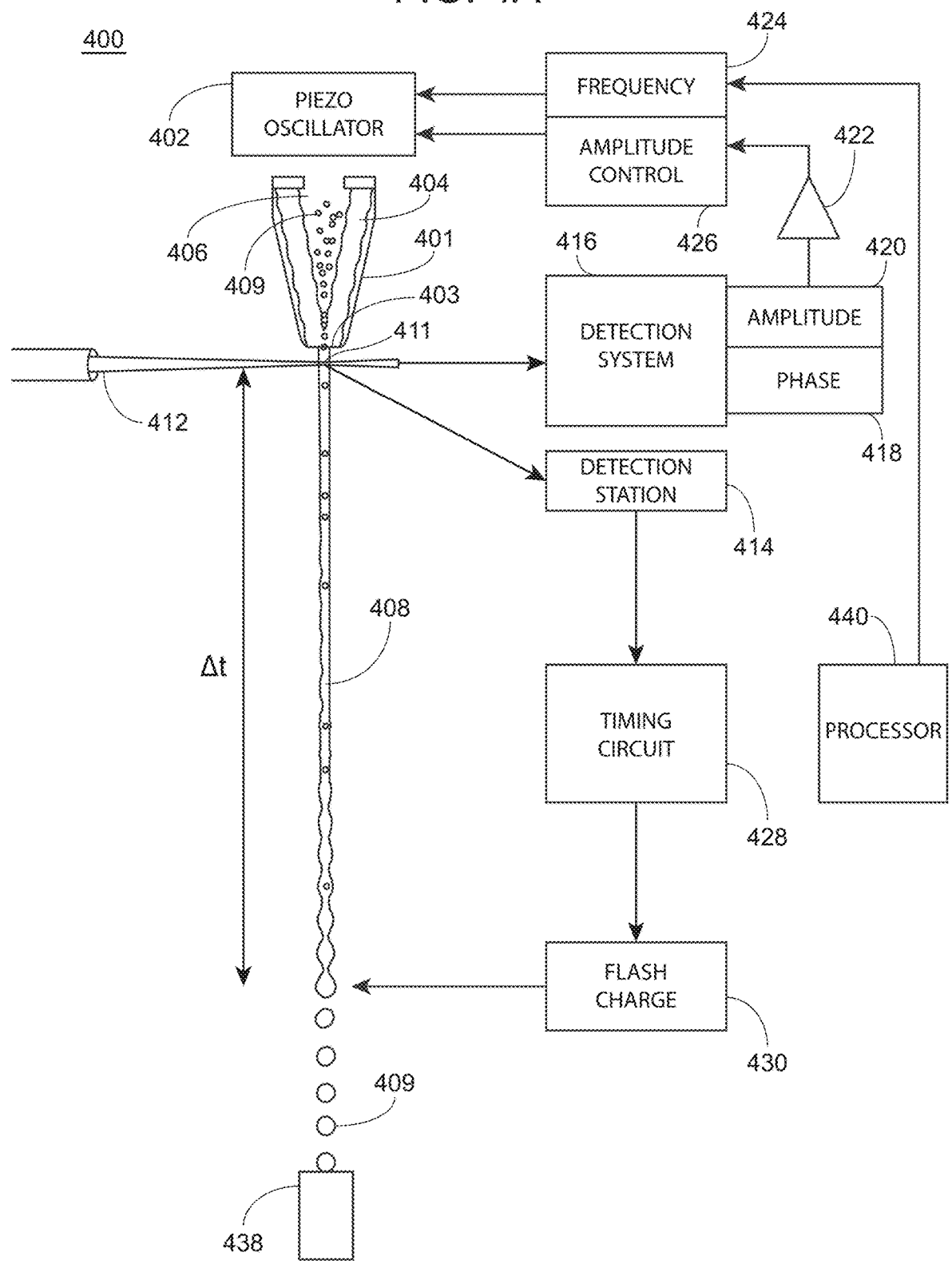
FIG. 4A depicts a schematic drawing of a particle sorter according to certain embodiments.

FIG. 4A is a schematic drawing of a particle sorter 400 in accordance with one embodiment presented herein. In some embodiments, the particle sorter 400 is a cell sorter system. As shown in FIG. 4A, a drop formation transducer 402 (e.g., piezo-oscillator) is coupled to a fluid conduit 401, which can be coupled to, can include, or can be, a nozzle 403. Within the fluid conduit 401, sheath fluid 404 hydrodynamically focuses a sample fluid 406 comprising particles 409 into a moving fluid column 408 (e.g., a stream). Within the moving fluid column 408, particles 409 (e.g., cells) are lined up in single file to cross a monitored area 411 (e.g., where laser-stream intersect, the interrogation point), irradiated by an irradiation source 412 (e.g., a laser). Vibration of the drop formation transducer 402 causes moving fluid column 408 to break into a plurality of drops 410 (the droplet stream), some of which contain particles 409.

In operation, a detection station 414 (e.g., an event detector) identifies when a particle of interest (or cell of interest) crosses the monitored area 411. Detection station 414 feeds into a timing circuit 428, which in turn feeds into a flash charge circuit 430. At a drop break off point, informed by a timed drop delay ($\Delta t$), a flash charge can be applied to the moving fluid column 408 such that a drop of interest carries a charge. The drop of interest can include one or more particles or cells to be sorted. The charged drop can then be sorted by activating deflection plates (not shown) to deflect the drop into partitions, for example, a vessel such as a collection tube or a multi-well or microwell sample plate where a partition or a well or a microwell can be associated with drops of particular interest. As shown in FIG. 4A, the drops can be collected in a drain receptacle 438.

A detection system 416 (e.g., a drop boundary detector) serves to automatically determine the phase of a drop drive signal when a particle of interest passes the monitored area 411. An exemplary drop boundary detector is described in U.S. Pat. No. 7,679,039, which is incorporated herein by reference in its entirety. The detection system 416 allows the instrument to accurately calculate the place of each detected particle in a drop. The detection system 416 can feed into an amplitude signal 420 and/or phase 418 signal, which in turn feeds (via amplifier 422) into an amplitude control circuit 426 and/or frequency control circuit 424. The amplitude control circuit 426 and/or frequency control circuit 424, in turn, controls the drop formation transducer 402. The amplitude control circuit 426 and/or frequency control circuit 424 can be included in a control system.

In some implementations, sort electronics (e.g., the detection system 416, the detection station 414 and a processor 440) can be coupled with a memory configured to store the detected events and a sort decision based thereon. The sort decision can be included in the event data for a particle. In some implementations, the detection system 416 and the detection station 414 can be implemented as a single detection unit or communicatively coupled such that an event measurement can be collected by one of the detection system 416 or the detection station 414 and provided to the non-collecting element.

FIG. 4B is a schematic drawing of a particle sorter in accordance with one embodiment presented herein. The particle sorter 400 shown in FIG. 4B includes a first deflection plate 452 and a second deflection plate 454 according to the present disclosure. A charge can be applied via a stream-charging wire in a barb. This creates a stream of droplets 410 containing particles 410 for analysis. The particles can be illuminated with one or more light sources (e.g., lasers) to generate light scatter and fluorescence information. The information for a particle is analyzed such as by sorting electronics or other detection system (not shown in FIG. 4B). The first 452 and second deflection plates 454 can be independently controlled to attract or repel the charged droplet to guide the droplet toward a destination collection receptacle (e.g., one of 472, 474, 476, or 478), such as a partition. As shown in FIG. 4B, the first 452 and second deflection plates 454 can be controlled to direct a particle along a first path 462 toward the receptacle 474 or along a second path 468 toward the receptacle 478. The first 452 and second deflection plates 454 may be offset from each other (e.g., by adjusting the position of the first deflection plate 452 upwards or downwards out of the plane of the figure) such that they apply a known offset deflection force. In some cases, such known offset deflection force may be applied in order to more accurately align deflected droplets with collection receptacles 472, 474, 476, and 478. If the particle is not of interest (e.g., does not exhibit scatter or illumination information within a specified sort range), deflection plates may allow the particle to continue along a flow path 464. Such uncharged droplets may pass into a waste receptacle such as via aspirator 470.

The sorting electronics can be included to initiate collection of measurements, receive fluorescence signals for particles, and determine how to adjust the deflection plates to cause sorting of the particles. Example implementations of the embodiment shown in FIG. 4B include the BD FACSAria™ line of flow cytometers commercially provided by Becton, Dickinson and Company (Franklin Lakes, NJ).

In embodiments, particle sorters according to the present disclosure further comprise droplet generators. Droplet generators may be any convenient device suitable for producing a droplet stream from fluid exiting the flow cell. In embodiments, the fluid exiting the flow cell is continuous and connected, and the droplet generator causes the continuous and connected fluid exiting the flow cell to form disjunct and discrete droplets. In some examples, the droplet generator is an oscillating transducer. For example, in some cases, the oscillating transducer is a piezo-oscillator. The vibration of the droplet generator causes fluid moving therein to break into a plurality of droplets of the droplet stream. The amplitude and the frequency at which the droplet generator vibrates affects characteristics of the droplets and the droplet stream formed by the droplet generator.

In instances, the particle sorter further comprises a plurality of partitions configured to receive droplets generated by the droplet generator and deflected by the droplet deflector. By partition, it is meant any convenient container capable of receiving one or more droplets of the droplet stream, such as droplets that contain a sorted particle such as a cell, sorted by the particle sorter and maintaining the contents of the partition separate and isolated from other materials not sorted into the partition. Embodiments include more than one partition, such as two partitions, four partitions, 96 partitions or 1536 or more partitions. Partitions may be any convenient size that is capable of receiving and maintaining droplets of the droplet stream, such as droplets that contain a sorted particle such as a cell, isolated from the droplet stream. In some cases, partitions are sized to hold more than one droplet, such as 10 droplets, 100 droplets, 1000 droplets, 10000 droplets or more. In some embodiments, partitions comprise a collection container. In instances, the collection container is a multi-well plate. Wells of the multi-well plate may be any convenient shape. In some instances, the shape of the lateral cross section of the wells is circular; in other cases, it is rectangular or square. Wells may be any size with sufficient capacity for holding droplets, such as droplets that contain a sorted particle such as a cell, as needed. For example, the volume of a well may be 0.001 mL or more, such as 0.005 mL or 0.015 mL or 0.1 mL or 2 mL or 5 mL or more. The multi-well plate may include any number of wells. In instances, a multi-well plate may include six or 12 or 24 or 48 or 96 or 384 or 1536 or 3456 or 9600 or more wells. In some instances, the multi-well plate has 1536 or fewer wells. Wells of a multi-well plate may be arranged in any convenient pattern. In some instances, wells are arranged in a rectangular shape with a length to width ratio of approximately two to three. In some instances, multi-well plates of the present disclosure may conform to accepted standards such as a standard established by the Society for Biomolecular Sciences with the ANSI-Standards. Multi-well plates may be composed of any convenient material. In some cases, multi-well plates may be composed of polypropylene, polystyrene or polycarbonate. In other instances, the partitions may comprise collection tubes. Wells may be any size and shape of a lateral cross section with sufficient capacity for holding droplets, such as droplets that contain a sorted particle such as a cell, as needed. In some cases, each collection tube has a lateral cross section shape of a circle with a diameter of 1.8 mm or less.

As described in detail above, particle sorters according to embodiments of the present disclosure may be configured for sorting particles in a sample, such as cells in a biological sample. In these embodiments, the droplet deflector of the particle sorter is configured to apply a known offset deflection force sufficient to deflect particles flowing in a droplet stream into one or more sample collection containers. Panels A-C of FIG. 5 illustrate the effect of applying a known offset deflection force to droplets of a droplet stream in an embodiment of a particle sorter according to the present disclosure by showing the droplet deposition positions when applying known offset deflection forces with varying degrees of a known offset. The effect of the known offset deflection force is seen with reference to the wells of a multi-well plate configured to receive droplets deflected by the droplet deflector of the particle sorter, the positions and orientations of which are substantially held constant between Panels A-C. The multi-well plate sits in the horizontal plane orthogonal to the longitudinal axis of the droplet stream, described above and includes a row of wells that extend exclusively in the "side-to-side" direction of the horizontal plane (i.e., the x-axis of an overlaid x-y-z coordinate system), as described above.

Panel A of FIG. 5 shows the resulting droplet deposition positions (i.e., the locations at which droplets are deposited) of a standard deflection force, i.e., a deflection force that does not include a known offset (in other words, a deflection force where the known offset is zero). In Panel A, the multi-well plate 510 includes a row of wells 520 that extend exclusively in the "side-to-side" axis of the multi-well plate 510 and the horizontal plane. The droplet deposition positions 530 result from applying a deflection force to droplets of the droplet stream without a known offset component (i.e., the known offset is zero). Because the known offset of the deflection force is zero, the droplet deposition positions 530 extend exclusively in the "side-to-side" axis of the horizontal plane. Because the deflection force applied to these droplets does not include a known offset component, the droplet deposition positions 530 do not extend in the "front-to-back" axis (i.e., the y-axis of an overlaid x-y-z coordinate system), as described above.

Panel B of FIG. 5 shows the resulting droplet deposition positions of a known offset deflection force that includes a known offset directing droplets toward the "backwards" direction of the "front-to-back" axis (i.e., the y-axis of an overlaid x-y-z coordinate system). In Panel B, the multi-well plate 540 includes a row of wells 550 that extend exclusively in the "side-to-side" axis of the multi-well plate 540 and the horizontal plane. The droplet deposition positions 560 resulting from applying a known offset deflection force to droplets of the droplet stream with a known offset component directed toward the "backwards" direction of the "front-to-back" axis of the multi-well plate are shown in Panel B. Because the known offset of the deflection force is directed "backwards," the droplet deposition positions 560 extend both in the "side-to-side" axis and also towards the back of the "front-to-back" axis, as seen on the left side of the multi-well plate 540 in Panel B. Because the deflection force applied to droplets includes a known offset component directing some droplets toward the "backwards" direction, the droplet deposition positions 560 extend, in part, in the "front-to-back" axis of the multi-well plate. That is, the droplet deposition positions shown in Panel B resulting from the application of the known offset deflection force are seen as extending in both the x-axis as well as the y-axis of an overlaid x-y-z plane.

Panel C of FIG. 5 shows the resulting droplet deposition positions of a known offset deflection force that include a known offset directing droplets toward the "frontwards" direction of the "front-to-back" axis (i.e., the y-axis of an overlaid x-y-z coordinate system). In Panel C, the multi-well plate 570 includes a row of wells 580 that extend exclusively in the "side-to-side" axis of the multi-well plate 570 and the horizontal plane. The droplet deposition positions 590 result from applying a deflection force to droplets of the droplet stream with a known offset component directed toward the "frontwards" direction of the "front-to-back" axis of the multi-well plate 570 in Panel C. Because the deflection force applied to droplets includes a known offset component directing some droplets toward the "frontwards" direction, the droplet deposition positions 590 extend both in the "side-to-side" axis of the horizontal plane and also towards the front of the "front-to-back" axis, as seen on the left side of the multi-well plate 570 in Panel C. Because the deflection force applied to droplets includes a known offset component directing droplets toward the "frontwards" direction, the droplet deposition positions 590 extend, in part, in the "front-to-back" axis of the multi-well plate. That is, the droplet deposition positions shown in Panel C resulting from the application of the known offset deflection force are seen as extending in both the x-axis as well as the y-axis of an overlaid x-y-z plane.

Particle sorters of the present disclosure include a flow cell. Flow cells of the subject particle sorters include an interrogation point. The interrogation point of flow cells are configured to be irradiated by a light source. In embodiments, flow cells of the subject particle sorting systems may also include a flow cell nozzle having a nozzle orifice configured to flow a flow stream through the flow cell nozzle. In some cases, the subject particle sorter includes a flow cell with a flow cell nozzle having an orifice which propagates a fluidic sample to a sample interrogation point, where in some embodiments, the flow cell nozzle includes a proximal cylindrical portion defining a longitudinal axis and a distal frustoconical portion which terminates in a flat surface having the nozzle orifice that is transverse to the longitudinal axis. The length of such proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of such distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the chamber of the flow cell nozzle may vary, in some embodiments, ranging from 1 mm to 10 mm, such as from 2 mm to 9 mm, such as from 3 mm to 8 mm and including from 4 mm to 7 mm.

In certain instances, the nozzle chamber does not include a cylindrical portion and the entire flow cell nozzle chamber is frustoconically shaped. In these embodiments, the length of the frustoconical nozzle chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical nozzle chamber may range from 1 mm to 10 mm, such as from 2 mm to 9 mm, such as from 3 mm to 8 mm and including from 4 mm to 7 mm.

In embodiments, a sample flow stream may emanate from an orifice at the distal end of the flow cell nozzle of the flow cell. Depending on the desired characteristics of such flow stream, the flow cell nozzle orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell nozzle of interest has a circular orifice. The size of the nozzle orifice may vary, in some embodiments ranging from 1 μm to 20,000 μm, such as from 2 μm to 17,500 μm, such as from 5 μm to 15,000 μm, such as from 10 μm to 12,500 μm, such as from 15 μm to 10,000 μm, such as from 25 μm to 7,500 μm, such as from 50 μm to 5,000 μm, such as from 75 μm to 1,000 μm, such as from 100 μm to 750 μm and including from 150 μm to 500 μm. In certain embodiments, the nozzle orifice is 100 μm.

In some embodiments, the flow cell nozzle of the flow cell includes a sample injection port configured to provide a sample to the flow cell nozzle. In embodiments, the sample injection system is configured to provide suitable flow of sample to the flow cell nozzle chamber. Depending on the desired characteristics of the flow stream, the rate of sample conveyed to the flow cell nozzle chamber by the sample injection port may be 1 μL/sec or more, such as 2 μL/sec or more, such as 3 μL/sec or more, such as 5 μL/sec or more, such as 10 μL/sec or more, such as 15 μL/sec or more, such as 25 μL/sec or more, such as 50 μL/sec or more, such as 100 μL/sec or more, such as 150 μL/sec or more, such as 200 μL/sec or more, such as 250 μL/sec or more, such as 300 μL/sec or more, such as 350 μL/sec or more, such as 400 μL/sec or more, such as 450 μL/sec or more and including 500 μL/sec or more. For example, the sample flow rate may range from 1 μL/sec to about 500 μL/sec, such as from 2 μL/sec to about 450 μL/sec, such as from 3 μL/sec to about 400 μL/sec, such as from 4 μL/sec to about 350 μL/sec, such as from 5 μL/sec to about 300 μL/sec, such as from 6 μL/sec to about 250 μL/sec, such as from 7 μL/sec to about 200 μL/sec, such as from 8 μL/sec to about 150 μL/sec, such as from 9 μL/sec to about 125 μL/sec and including from 10 μL/sec to about 100 μL/sec.

The sample injection port may be an orifice positioned in a wall of the nozzle chamber or may be a conduit positioned at the proximal end of the nozzle chamber. Where the sample injection port is an orifice positioned in a wall of the nozzle chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell nozzle chamber of the flow cell. For example, the sample injection port may be a conduit positioned to have the orifice of the sample injection port in line with the flow cell nozzle orifice. Where the sample injection port is a conduit positioned in line with the flow cell nozzle orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell nozzle of the flow cell also includes a sheath fluid injection port configured to provide a sheath fluid to the flow cell nozzle. In embodiments, the sheath fluid injection system is configured to provide a flow of sheath fluid to the flow cell nozzle chamber, for example in conjunction with the sample to produce a laminated flow stream of sheath fluid surrounding the sample flow stream. Depending on the desired characteristics of the flow stream, the rate of sheath fluid conveyed to the flow cell nozzle chamber by the may be 25 µL/sec or more, such as 50 µL/sec or more, such as 75 µL/sec or more, such as 100 µL/sec or more, such as 250 µL/sec or more, such as 500 µL/sec or more, such as 750 µL/sec or more, such as 1000 µL/sec or more and including 2500 µL/sec or more. For example, the sheath fluid flow rate may range from 1 µL/sec to about 500 µL/sec, such as from 2 µL/sec to about 450 µL/sec, such as from 3 µL/sec to about 400 µL/sec, such as from 4 µL/sec to about 350 µL/sec, such as from 5 µL/sec to about 300 µL/sec, such as from 6 µL/sec to about 250 µL/sec, such as from 7 µL/sec to about 200 µL/sec, such as from 8 µL/sec to about 150 µL/sec, such as from 9 µL/sec to about 125 µL/sec and including from 10 µL/sec to about 100 µL/sec.

In some embodiments, the sheath fluid injection port is an orifice positioned in a wall of the nozzle chamber of the flow cell. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

The particle sorter also includes an interrogation point (i.e., a sample interrogation point). In some cases, the sample interrogation point is in fluid communication with the flow cell nozzle orifice. As described in greater detail below, a sample flow stream may emanate from an orifice at the distal end of the flow cell nozzle and particles in the flow stream may be irradiated with a light source at the sample interrogation point of the flow cell of the particle sorter. The size of the interrogation point of the particle sorter may vary depending on the properties of the flow nozzle, such as the size of the nozzle orifice and sample injection port size. In embodiments, the interrogation point may have a width that is 0.01 mm or more, such as 0.05 mm or more, such as 0.1 mm or more, such as 0.5 mm or more, such as 1 mm or more, such as 2 mm or more, such as 3 mm or more, such as 5 mm or more and including 10 mm or more. The length of the interrogation point may also vary, ranging in some instances along 0.01 mm or more, such as 0.1 mm or more, such as 0.5 mm or more, such as 1 mm or more, such as 1.5 mm or more, such as 2 mm or more, such as 3 mm or more, such as 5 mm or more, such as 10 or more, such as 15 mm or more, such as 20 mm or more, such as 25 mm or more and including 50 mm or more of the particle sorter.

The interrogation point of the flow cell of the particle sorter may be configured to facilitate irradiation of a planar cross-section of an emanating flow stream or may be configured to facilitate irradiation of a diffuse field (e.g., with a diffuse laser or lamp) of a predetermined length. In some embodiments, the interrogation point of the flow cell includes a transparent window that facilitates irradiation of a predetermined length of an emanating flow stream, such as 1 mm or more, such as 2 mm or more, such as 3 mm or more, such as 4 mm or more, such as 5 mm or more and including 10 mm or more. Depending on the light source used to irradiate the emanating flow stream (as described below), the interrogation region of the particle sorting module may be configured to pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm. As such, the flow cell of the particle sorter at the interrogation point may be formed from any transparent material which passes the desired range of wavelength, including but not limited to optical glass, borosilicate glass, Pyrex glass, ultraviolet quartz, infrared quartz, sapphire as well as plastic, such as polycarbonates, polyvinyl chloride (PVC), polyurethanes, polyethers, polyamides, polyimides, or copolymers of these thermoplastics, such as PETG (glycol-modified polyethylene terephthalate), among other polymeric plastic materials, including polyester, where polyesters of interest may include, but are not limited to poly (alkylene terephthalates) such as poly(ethylene terephthalate) (PET), bottle-grade PET (a copolymer made based on monoethylene glycol, terephthalic acid, and other comonomers such as isophthalic acid, cyclohexene dimethanol, etc.), poly(butylene terephthalate) (PBT), and poly (hexamethylene terephthalate); poly(alkylene adipates) such as poly(ethylene adipate), poly(1,4-butylene adipate), and poly(hexamethylene adipate); poly(alkylene suberates) such as poly(ethylene suberate); poly(alkylene sebacates) such as poly(ethylene sebacate); poly(ε-caprolactone) and poly(β-propiolactone); poly(alkylene isophthalates) such as poly (ethylene isophthalate); poly(alkylene 2,6-naphthalene-dicarboxylates) such as poly(ethylene 2,6-naphthalene-dicarboxylate); poly(alkylene sulfonyl-4,4'-dibenzoates) such as poly(ethylene sulfonyl-4,4'-dibenzoate); poly(p-phenylene alkylene dicarboxylates) such as poly(p-phenylene ethylene dicarboxylates); poly(trans-1,4-cyclohexanediyl alkylene dicarboxylates) such as poly(trans-1,4-cyclohexanediyl ethylene dicarboxylate); poly(1,4-cyclohexane-dimethylene alkylene dicarboxylates) such as poly(1,4-cyclohexane-dimethylene ethylene dicarboxylate); poly ([2.2.2]-bicyclooctane-1,4-dimethylene alkylene dicarboxylates) such as poly([2.2.2]-bicyclooctane-1,4-dimethylene ethylene dicarboxylate); lactic acid polymers and copolymers such as (S)-polylactide, (R,S)-polylactide, poly (tetramethylglycolide), and poly(lactide-co-glycolide); and polycarbonates of bisphenol A, 3,3'-dimethylbisphenol A, 3,3',5,5'-tetrachlorobisphenol A, 3,3',5,5'-tetramethylbisphenol A; polyamides such as poly(p-phenylene terephthalamide); polyesters, e.g., polyethylene terephthalates, e.g., Mylar™ polyethylene terephthalate; etc. In some embodiments, flow cells of interest include a cuvette positioned in the sample interrogation point. In embodiments, the cuvette may pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm.

In some embodiments, the sample interrogation point includes one or more optical adjustment components. By "optical adjustment" is meant that light irradiated onto the sample interrogation point or light collected from an irradiated flow stream is changed as desired. In some embodiments, the sample interrogation point includes an optical adjustment component for adjusting the light irradiated onto the sample interrogation point by a light source. In other embodiments, the sample interrogation point includes an optical adjustment component for adjusting light emanating from an irradiated flow stream before being conveyed to a detector for measurement. In yet other embodiments, the sample interrogation point includes an optical adjustment component for adjusting both the light irradiated onto the sample interrogation point by a light source and the light emanating from an irradiated flow stream before being conveyed to a detector for measurement. For example, the optical adjustment may be to increase the dimensions of the light, the focus of the light or to collimate the light. In some instances, optical adjustment is a magnification protocol so as to increase the dimensions of the light (e.g., beam spot), such as increasing the dimensions by 5% or more, such as by 10% or more, such as by 25% or more, such as by 50% or more and including increasing the dimensions by 75% or more. In other embodiments, optical adjustment includes focusing the collected the light so as to reduce the light dimensions, such as by 5% or greater, such as by 10% or greater, such as by 25% or greater, such as by 50% or greater and including reducing the dimensions of the beam spot by 75% or greater. In certain embodiments, optical adjustment includes collimating the light. The term "collimate" is used in its conventional sense to refer to the optically adjusting the collinearity of light propagation or reducing divergence by the light of from a common axis of propagation. In some instances, collimating includes narrowing the spatial cross section of a light beam.

Optical adjustment components may be any convenient device or structure which provides the desired change in the collected light and may include, but is not limited to, lenses, mirrors, pinholes, slits, gratings, light refractors, and any combinations thereof. The particle sorter may include one or more optical adjustment components at the sample interrogation point as needed, such as two or more, such as three or more, such as four or more and including five or more optical adjustment components.

In some embodiments, the optical adjustment component is a focusing lens having a magnification ratio of from 0.1 to 0.95, such as a magnification ratio of from 0.2 to 0.9, such as a magnification ratio of from 0.3 to 0.85, such as a magnification ratio of from 0.35 to 0.8, such as a magnification ratio of from 0.5 to 0.75 and including a magnification ratio of from 0.55 to 0.7, for example a magnification ratio of 0.6. For example, the focusing lens is, in certain instances, a double achromatic de-magnifying lens having a magnification ratio of about 0.6. The focal length of the focusing lens may vary, ranging from 5 mm to 20 mm, such as from 6 mm to 19 mm, such as from 7 mm to 18 mm, such as from 8 mm to 17 mm, such as from 9 mm to 16 and including a focal length ranging from 10 mm to 15 mm. In certain embodiments, the focusing lens has a focal length of about 13 mm.

In other embodiments, the optical adjustment component is a collimator. The collimator may be any convenient collimating protocol, such as one or more mirrors or curved lenses or a combination thereof. For example, the collimator is in certain instances a single collimating lens. In other instances, the collimator is a collimating mirror. In yet other instances, the collimator includes two lenses. In still other instances, the collimator includes a mirror and a lens. Where the collimator includes one or more lenses, the focal length of the collimating lens may vary, ranging from 5 mm to 40 mm, such as from 6 mm to 37.5 mm, such as from 7 mm to 35 mm, such as from 8 mm to 32.5 mm, such as from 9 mm to 30 mm, such as from 10 mm to 27.5 mm, such as from 12.5 mm to 25 mm and including a focal length ranging from 15 mm to 20 mm.

In certain embodiments, the optical adjustment component is a wavelength separator. The term "wavelength separator" is used herein in its conventional sense to refer to an optical protocol for separating polychromatic light into its component wavelengths. Wavelength separation, according to certain embodiments, may include selectively passing or blocking specific wavelengths or wavelength ranges of the polychromatic light. Wavelength separation protocols of interest which may be a part of or combined with flow cell nozzles discussed above, include but are not limited to, colored glass, bandpass filters, interference filters, dichroic mirrors, diffraction gratings, monochromators and combinations thereof, among other wavelength separating protocols. In some embodiments, the wavelength separator is an optical filter. For example, the optical filter may be a bandpass filter having minimum bandwidths ranging from 2 nm to 100 nm, such as from 3 nm to 95 nm, such as from 5 nm to 95 nm, such as from 10 nm to 90 nm, such as from 12 nm to 85 nm, such as from 15 nm to 80 nm and including bandpass filters having minimum bandwidths ranging from 20 nm to 50 nm.

In embodiments, the light source of the particle sorter may be any suitable broadband or narrow band source of light. In some cases, depending on the components of a sample at the interrogation point of the flow cell (e.g., cells, calibration particles such as beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm. In certain embodiments, the light source is a laser. In some instances, the subject particle sorters include a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject particle sorters include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject particle sorters include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

In other embodiments, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, a multi-LED integrated light source. In some instances, the non-laser light source is a stabilized fiber-coupled broadband light source, white light source, among other light sources or any combination thereof.

The light source may be positioned any suitable distance from a sample at the interrogation point of the flow cell (e.g., a flow stream in a flow cytometer), such as at a distance of 0.001 mm or more from the flow stream, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may irradiate the sample at the interrogation point of the flow cell at any suitable angle (e.g., relative the vertical axis of the flow stream), such as at an angle ranging from 10° to 90°, such as from 15° to 85°, such as from 20° to 80°, such as from 25° to 75° and including from 30° to 60°, for example at a 90° angle.

The light source may be configured to irradiate a sample at the interrogation point of the flow cell continuously or in discrete intervals. In some instances, particle sorters include a light source that is configured to irradiate a sample continuously, such as with a continuous wave laser that continuously irradiates, e.g., a flow stream at the interrogation point in a flow cytometer. In other instances, particle sorters of interest include a light source that is configured to irradiate a sample at discrete intervals, such as every 0.001 milliseconds, every 0.01 milliseconds, every 0.1 milliseconds, every 1 millisecond, every 10 milliseconds, every 100 milliseconds and including every 1000 milliseconds, or some other interval. Where the light source is configured to irradiate the sample at discrete intervals, particle sorters may include one or more additional components to provide for intermittent irradiation of a sample with the light source. For example, the subject particle sorters in these embodiments may include one or more laser beam choppers, manually or computer controlled beam stops for blocking and exposing the sample to the light source.

In some embodiments, the light source is a laser. Lasers of interest may include pulsed lasers or continuous wave lasers. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof; a semiconductor diode laser, optically pumped semiconductor laser (OPSL), or a frequency doubled or frequency tripled implementation of any of the above mentioned lasers.

In certain embodiments, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser, such as described above.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory that may include instructions to produce 100 or more angularly deflected laser beams with the same intensities. In other embodiments, the memory may include instructions to produce two or more angularly deflected laser beams with different intensities, such as 3 or more, such as 4 or more, such as 5 or more, such as or more, such as 25 or more, such as 50 or more and including memory that may include instructions to produce 100 or more angularly deflected laser beams with different intensities.

In certain embodiments, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the controller has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the controller has a processor having memory operably coupled to the processor such that the memory includes instructions stored thereon, which when executed by the processor, cause the processor to produce an output laser beam having a top hat intensity profile along the horizontal axis.

In embodiments, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, light beam generators configured to generate two or more beams of frequency shifted light include laser excitation modules as described in U.S. Pat. Nos. 9,423,353; 9,784,661 and 10,006,852 and U.S. Patent Publication Nos. 2017/0133857 and 2017/0350803, the disclosures of which are herein incorporated by reference.

In embodiments, particle sorters include a detector for detecting light from the interrogation point of the flow cell that comprises a light detection system. Light detection systems of interest may include one or more photodetectors. Photodetectors of interest may include, but are not limited to optical sensors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from the interrogation point is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors.

In some embodiments, light detectors of interest include a plurality of photodetectors. In some instances, the light detector includes a plurality of solid-state detectors such as photodiodes. In certain instances, the light detector includes a photodetector array, such as an array of photodiodes. In these embodiments, the photodetector array may include 4 or more photodetectors, such as 10 or more photodetectors, such as 25 or more photodetectors, such as 50 or more photodetectors, such as 100 or more photodetectors, such as 250 or more photodetectors, such as 500 or more photodetectors, such as 750 or more photodetectors and including 1000 or more photodetectors. For example, the detector may be a photodiode array having 4 or more photodiodes, such as 10 or more photodiodes, such as 25 or more photodiodes, such as 50 or more photodiodes, such as 100 or more photodiodes, such as 250 or more photodiodes, such as 500 or more photodiodes, such as 750 or more photodiodes and including 1000 or more photodiodes.

The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The photodetectors in the photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The photodetector array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the photodetector array has a rectangular-shaped active surface.

Each photodetector (e.g., photodiode) in the array may have an active surface with a width that ranges from 5 µm to 250 µm, such as from 10 µm to 225 µm, such as from 15 µm to 200 µm, such as from 20 µm to 175 µm, such as from 25 µm to 150 µm, such as from 30 µm to 125 µm and including from 50 µm to 100 µm and a length that ranges from 5 µm to 250 µm, such as from 10 µm to 225 µm, such as from 15 µm to 200 m, such as from 20 µm to 175 µm, such as from 25 µm to 150 µm, such as from 30 µm to 125 µm and including from 50 µm to 100 µm, where the surface area of each photodetector (e.g., photodiode) in the array ranges from 25 to m$^2$ to 10000 µm$^2$, such as from 50 to m$^2$ to 9000 µm$^2$, such as from 75 to m$^2$ to 8000 µm$^2$, such as from 100 to m$^2$ to 7000 µm$^2$, such as from 150 to m$^2$ to 6000 µm$^2$ and including from 200 to m$^2$ to 5000 µm$^2$.

The size of the photodetector array may vary depending on the amount and intensity of the light, the number of photodetectors and the desired sensitivity and may have a length that ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. The width of the photodetector array may also vary, ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. As such, the active surface of the photodetector array may range from 0.1 mm$^2$ to 10000 mm$^2$, such as from 0.5 mm$^2$ to 5000 mm$^2$, such as from 1 mm$^2$ to 1000 mm$^2$, such as from 5 mm$^2$ to 500 mm$^2$, and including from 10 mm$^2$ to 100 mm$^2$.

Photodetectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, photodetectors are configured to measure collected light over a range of wavelengths (e.g., 200 nm-1000 nm). In certain embodiments, photodetectors of interest are configured to collect spectra of light over a range of wavelengths. For example, systems may include one or more detectors configured to collect spectra of light over one or more of the wavelength ranges of 200 nm-1000 nm. In yet other embodiments, detectors of interest are configured to measure light from the sample in the flow stream at one or more specific wavelengths. For example, systems may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, photodetectors may be configured to be paired with specific fluorophores, such as those used with the sample in a fluorescence assay. In some embodiments, photodetectors are configured to measure collected light across the entire fluorescence spectrum of each fluorophore in the sample.

The detector is configured to measure light continuously or in discrete intervals. In some instances, detectors of interest are configured to take measurements of the collected light continuously. In other instances, the light detector is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In some instances, the light detector also includes an optical adjustment component. In some instances, optical adjustment is a magnification protocol configured to increase the size of the field of light captured by the detector, such as by 5% or greater, such as by 10% or greater, such as by 25% or greater, such as by 50% or greater and including increasing the field of light captured by the detector by 75% or greater. In other instances, optical adjustment is a de-magnification protocol configured to decrease the field of light captured by the detector, such as by 5% or greater, such as by 10% or greater, such as by 25% or greater, such as by 50% or greater and including decreasing the field of light captured by the detector by 75% or greater. In certain embodiments, optical adjustment is a focusing protocol configured to focus the light collected by the detector, such as by focusing the beam of collected light by 5% or greater, such as by 10% or greater, such as by 25% or greater, such as by 50% or greater and including focusing the beam of collected light by 75% or greater.

Optical adjustment components may be any convenient device or structure which provides the desired change in the collected light beam and may include but is not limited to lenses, mirrors, pinholes, slits, gratings, light refractors, and any combinations thereof. The detector may include one or more optical adjustment components as needed, such as two or more, such as three or more, such as four or more and including five or more optical adjustment components. In certain embodiments, the detector includes a focusing lens. The focusing lens, for example may be a de-magnifying lens. In other instances, the focusing lens is a magnifying lens. In other embodiments, the detector includes a collimator.

In certain embodiments, particle sorters include a combination of different optical adjustment components, such as a combination of pinholes, lenses, mirrors, slits, etc. For example, in some embodiments, particle sorters include a focusing lens and a collimating lens. In other embodiments, particle sorters include a collimating mirror and a focusing lens. In yet other embodiments, particle sorters include a focusing lens and a pinhole structure. In still other embodiments, particle sorters include a collimating lens and a pinhole structure. In still other embodiments, particle sorters include a collimating lens and a slit structure.

In some embodiments, the detector and the optical adjustment component are in optical communication but are not physically in contact. Depending on the size of the detector, the optical adjustment component may be positioned 0.05 mm or more from the detector, 0.1 mm or more, such as 0.5 mm or more, such as 1 mm or more, such as 10 mm or more, such as 25 mm or more, such as 50 mm or more, such as 100 mm or more, such as 250 mm or more, including 500 mm or more. In other embodiments, the optical adjustment component is physically coupled to the detector, such as with an adhesive, co-molded together or integrated together in a housing having the optical adjustment component positioned adjacent to the detector. As such, the optical adjustment component and detector may be integrated into a single unit.

In some embodiments, the optical adjustment component is a focusing lens having a magnification ratio of from 0.1 to 0.95, such as a magnification ratio of from 0.2 to 0.9, such as a magnification ratio of from 0.3 to 0.85, such as a magnification ratio of from 0.35 to 0.8, such as a magnification ratio of from 0.5 to 0.75 and including a magnification ratio of from 0.55 to 0.7, for example a magnification ratio of 0.6. For example, the focusing lens is, in certain instances, a double achromatic de-magnifying lens having a magnification ratio of about 0.6. Depending on the distance between the detector and the lens, the surface area of the detector active surface, the focal length of the focusing lens may vary, ranging from 5 mm to 20 mm, such as from 6 mm to 19 mm, such as from 7 mm to 18 mm, such as from 8 mm to 17 mm, such as from 9 mm to 16 and including a focal length ranging from 10 mm to 15 mm. In certain embodiments, the focusing lens has a focal length of about 13 mm.

In certain embodiments, optical adjustment components include one or more fiber optics which are configured to relay light from the interrogation point of the flow cell to the detector. Suitable fiber optics for propagating light from the interrogation point of the flow cell to the active surface of the detector include, but are not limited to, flow cytometer fiber optics systems such as those described in U.S. Pat. No. 6,809,804, the disclosure of which is herein incorporated by reference.

In other embodiments, detectors of interest are coupled to a collimator. The collimator may be any convenient collimating protocol, such as one or more mirrors or curved lenses or a combination thereof. For example, the collimator is, in certain instances, a single collimating lens. In other instances, the collimator is a collimating mirror. In yet other instances, the collimator includes a series of two or more lenses, such as three or more lenses and including four or more lenses. In still other instances, the collimator includes a mirror and a lens. Where the collimator includes one or more lenses, the focal length of the collimating lens may vary, ranging from 5 mm to 40 mm, such as from 6 mm to 37.5 mm, such as from 7 mm to 35 mm, such as from 8 mm to 32.5 mm, such as from 9 mm to 30 mm, such as from 10 mm to 27.5 mm, such as from 12.5 mm to 25 mm and including a focal length ranging from 15 mm to 20 mm.

In certain embodiments, the optical adjustment component is a wavelength separator. As discussed above, wavelength separators of interest refer to an optical protocol for separating polychromatic light into its component wavelengths for detection. Wavelength separation, according to certain embodiments, may include selectively passing or blocking specific wavelengths or wavelength ranges of the polychromatic light. To separate wavelengths of light, the light emitted by a sample in the flow stream may be passed through any convenient wavelength separating protocol, including but not limited to colored glass, bandpass filters, interference filters, dichroic mirrors, diffraction gratings, monochromators and combinations thereof, among other wavelength separating protocols. Particle sorters may include one or more wavelength separators, such as two or more, such as three or more, such as four or more, such as five or more and including 10 or more wavelength separators. In one example, detectors include one bandpass filter. In another example, detectors include two or more bandpass filters. In another example, detectors include two or more bandpass filters and a diffraction grating. In yet another example, detectors include a monochromator. In certain embodiments, detectors include a plurality of bandpass filters and diffraction gratings configured into a filter wheel setup. Where detectors include two or more wavelength separators, the wavelength separators may be utilized individually or in series to separate polychromatic light into component wavelengths. In some embodiments, wavelength separators are arranged in series. In other embodiments, wavelength separators are arranged individually such that one or more measurements are conducted using each of the wavelength separators.

In some embodiments, detectors include one or more optical filters, such as one or more bandpass filters. For example, optical filters of interest may include bandpass filters having minimum bandwidths ranging from 2 nm to 100 nm, such as from 3 nm to 95 nm, such as from 5 nm to 95 nm, such as from 10 nm to 90 nm, such as from 12 nm to 85 nm, such as from 15 nm to 80 nm and including bandpass filters having minimum bandwidths ranging from 20 nm to 50 nm. In other embodiments, the wavelength separator is a diffraction grating. Diffraction gratings may include, but are not limited to transmission, dispersive or reflective diffraction gratings. Suitable spacings of the diffraction grating may vary depending on the configuration of the flow cell nozzle chamber, detector and other optical adjust protocols present (e.g., focusing lens), ranging from 0.01 µm to 10 µm, such as from 0.025 µm to 7.5 µm, such as from 0.5 µm to 5 µm, such as from 0.75 µm to 4 µm, such as from 1 µm to 3.5 µm and including from 1.5 µm to 3.5 µm.

Figure 6:
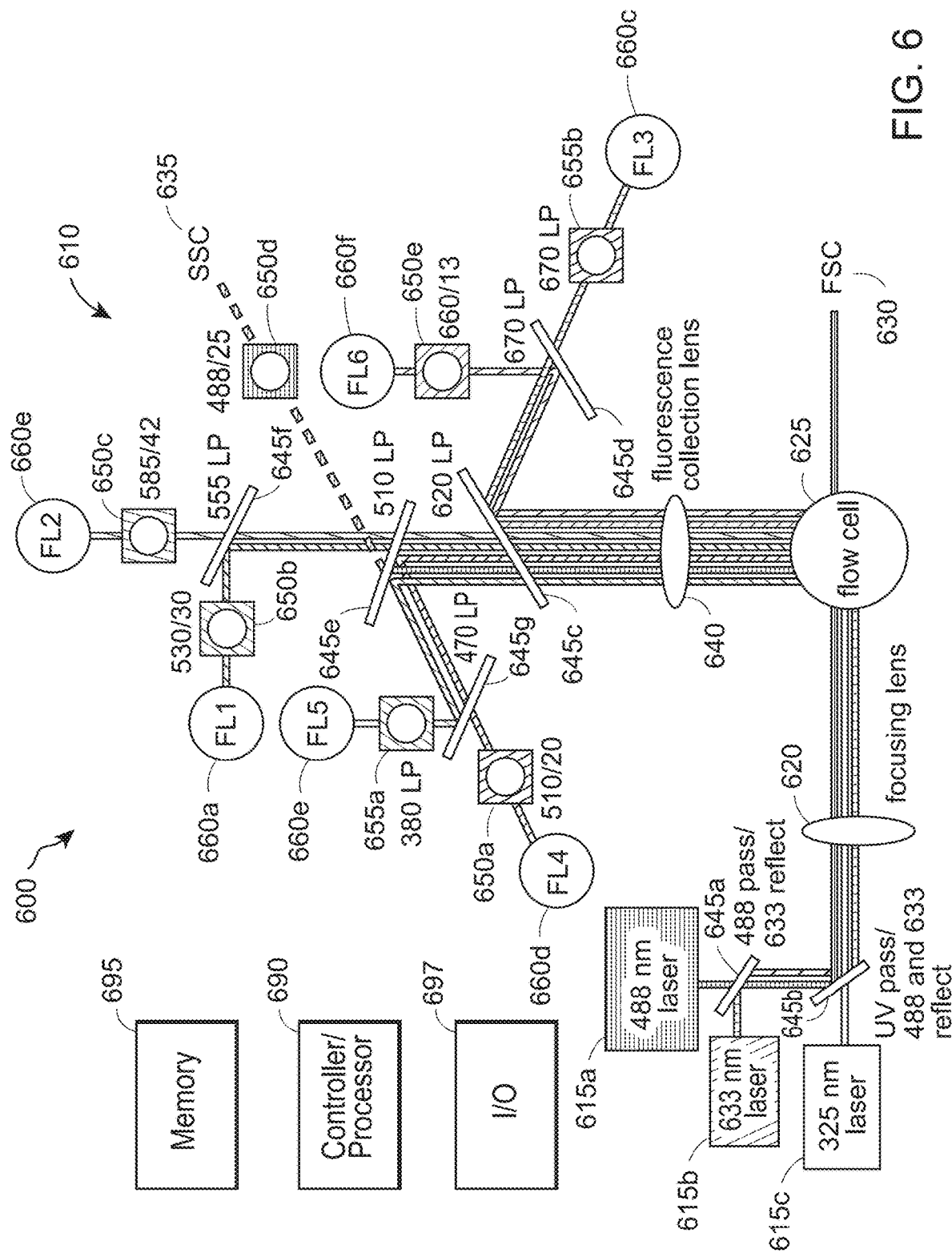
FIG. 6 depicts a flow cytometer according to certain embodiments.

FIG. 6 shows a flow cytometric particle sorter 600 in accordance with an illustrative embodiment of the present invention. The particle sorter 600 includes a flow cytometer 610, a controller/processor 690 and a memory 695. The flow cytometer 610 includes one or more excitation lasers 615a-615c, a focusing lens 620, a flow chamber (i.e., a flow cell) 625, a forward scatter detector 630, a side scatter detector 635, a fluorescence collection lens 640, one or more beam splitters 645a-645g, one or more bandpass filters 650a-650e, one or more longpass ("LP") filters 655a-655b, and one or more fluorescent detectors 660a-660f.

The excitation lasers 615a-c emit light in the form of a laser beam. The wavelengths of the laser beams emitted from excitation lasers 615a-615c are 488 nm, 633 nm, and 325 nm, respectively, in the example particle sorter of FIG. 6. The laser beams are first directed through one or more of beam splitters 645a and 645b. Beam splitter 645a transmits light at 488 nm and reflects light at 633 nm. Beam splitter 645b transmits UV light (light with a wavelength in the range of 10 to 400 nm) and reflects light at 488 nm and 633 nm.

The laser beams are then directed to a focusing lens 620, which focuses the beams onto the portion of a fluid stream where particles of a sample are located, within the flow chamber 625. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 630, the side scatter detector 635, and the one or more fluorescent detectors 660a-660f through one or more of the beam splitters 645a-645g, the bandpass filters 650a-650e, the longpass filters 655a-655b, and the fluorescence collection lens 640.

The fluorescence collection lens 640 collects light emitted from the particle-laser beam interaction and routes that light towards one or more beam splitters and filters. Bandpass filters, such as bandpass filters 650a-650e, allow a narrow range of wavelengths to pass through the filter. For example, bandpass filter 650a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 655a-655b, transmit wavelengths of light equal to or longer than a specified wavelength of light. For example, longpass filter 655a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 645g is a 620 SP beam splitter, meaning that the beam splitter 645g transmits wavelengths of light that are 620 nm or shorter and reflects wavelengths of light that are longer than 620 nm in a different direction. In one embodiment, the beam splitters 645a-645g can comprise optical mirrors, such as dichroic mirrors.

The forward scatter detector 630 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 635 is configured to detect refracted and reflected light from the surfaces and internal structures of the particle and tends to increase with increasing particle complexity of structure. The fluorescence emissions from fluorescent molecules associated with the particle can be detected by the one or more fluorescent detectors 660a-660f. The side scatter detector 635 and fluorescent detectors can include photomultiplier tubes. The signals detected at the forward scatter detector 630, the side scatter detector 635 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 6, but can include any flow cytometer known in the art. For example, a flow cytometer may have any number of lasers, beam splitters, filters, and detectors at various wavelengths and in various different configurations.

In operation, cytometer operation is controlled by a controller/processor 690, and the measurement data from the detectors can be stored in the memory 695 and processed by the controller/processor 690. Although not shown explicitly, the controller/processor 690 is coupled to the detectors to receive the output signals therefrom and may also be coupled to electrical and electromechanical components of the flow cytometer 600 to control the lasers, fluid flow parameters, and the like. Input/output (I/O) capabilities 697 may be provided also in the system. The memory 695, controller/processor 690, and I/O 697 may be entirely provided as an integral part of the flow cytometer 610. In such an embodiment, a display may also form part of the I/O capabilities 697 for presenting experimental data to users of the cytometer 600. Alternatively, some or all of the memory 695 and controller/processor 690 and I/O capabilities may be part of one or more external devices such as a general purpose computer. In some embodiments, some or all of the memory 695 and controller/processor 690 can be in wireless or wired communication with the cytometer 610. The controller/processor 690 in conjunction with the memory 695 and the I/O 697 can be configured to perform various functions related to the preparation and analysis of a flow cytometer experiment.

The system illustrated in FIG. 6 includes six different detectors that detect fluorescent light in six different wavelength bands (which may be referred to herein as a "filter window" for a given detector) as defined by the configuration of filters and/or splitters in the beam path from the flow cell 625 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 697 can be configured to receive data regarding a flow cytometer experiment having a panel of fluorescent labels and a plurality of cell populations having a plurality of markers, each cell population having a subset of the plurality of markers. The I/O 697 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 695. The controller/processor 690 can be configured to evaluate one or more assignments of labels to markers.

In certain embodiments, the subject particle sorters are flow cytometric systems employing the above droplet deflector configured to apply a known offset deflection force. In certain embodiments, the subject particle sorters are flow cytometric systems. Suitable flow cytometry systems may include, but are not limited to, those described in Ormerod (ed.), Flow Cytometry: A Practical Approach, Oxford Univ. Press (1997); Jaroszeski et al. (eds.), Flow Cytometry Protocols, Methods in Molecular Biology No. 91, Humana Press (1997); Practical Flow Cytometry, 3rd ed., Wiley-Liss (1995); Virgo, et al. (2012) Ann Clin Biochem. January; 49(pt 1):17-28; Linden, et. al., Semin Throm Hemost. 2004 October; 30(5):502-11; Alison, et al. J Pathol, 2010 December; 222(4):335-344; and Herbig, et al. (2007) Crit Rev Ther Drug Carrier Syst. 24(3):203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSRFortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like. In some instances, the cell sorter is a BD FACSymphony™ S6 cell sorter; BD FACSMelody™ cell sorter; BD FACSAria™ III cell sorter; BD FACSAria™ Fusion cell sorter; BD FACSJazz™ or BD Influx™ cell sorter.

In certain instances, the subject particle sorters are flow cytometry systems configured for imaging particles in a flow stream by fluorescence imaging using radiofrequency tagged emission (FIRE), such as those described in Diebold, et al. Nature Photonics Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

Methods for Deflecting Droplets of a Droplet Stream by Applying a Known Offset Deflection Force Aspects of the present disclosure include methods for deflecting droplets of a droplet stream with a droplet deflector configured to apply a known offset deflection force to the droplet stream. As described in greater detail above, by applying an "offset deflection force," it is meant, for example, that the deflection force which diverts droplets in the droplet stream may comprise both a "side-to-side" direction and a "front-to-back" direction within a horizontal plane that is orthogonal to the droplet stream, and in some cases, the deflection force is offset by applying the deflection force after rotating the angle at which the deflection force is applied to the droplet stream around the longitudinal axis of the droplet stream. As described above, by applying a "known offset deflection force," it is meant applying a deflection force to droplets of a droplet stream that is offset by design or a predetermined amount.

Methods according to certain embodiments include irradiating with a light source an interrogation point of a flow cell, detecting light from the interrogation point with a detector, producing a droplet stream from fluid exiting the flow cell with a droplet generator, and deflecting droplets of the droplet stream with a droplet deflector configured to apply a known offset deflection force to the droplet stream. Deflecting droplets, including to sort particles, such as cells, according to the subject methods results in increased sorting efficiency, such that fewer particles of a sample are wasted (i.e., in advertently deflecting droplets comprising particles, such as cells, into an unintended droplet deposition position such that they go unsorted) when sorting a sample. In some cases, the efficiency of sorting may be improved such that more variations of cell phenotypes may be collected and sorted when the subject methods are employed. When used as part of flow cytometrically sorting a sample, the subject methods can improve the yield of particle sorting.

In certain embodiments, the droplet stream comprises a sample that is a biological sample and methods include sorting and collecting two or more different types of cells, such that, in practicing the subject methods, a sample having particles is irradiated with a light source and light from the sample is detected with a light detection system having one or more photodetectors. In some embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class Mammalia, including the orders carnivore (e.g., dogs and cats), Rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In embodiments, an interrogation point of a flow cell is irradiated with light from a light source. In practicing the subject methods, for example, a sample (e.g., in a flow stream of a flow cytometer) may be irradiated in a flow cell with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, a multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the interrogation point with one or more lasers. As discussed above, the type and number of lasers will vary depending on the sample as well as desired light collected and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the methods include irradiating the flow stream with a dye laser, such as a stilbene, coumarin or rhodamine laser. In yet other instances, methods include irradiating the flow stream with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the flow stream with a solid-state laser, such as a ruby laser, an Nd:YAG laser, NdCrYAG laser, Er:YAG laser, Nd:YLF laser, $Nd:YVO_4$ laser, $Nd:YCa_4O(BO_3)_3$ laser, Nd:YCOB laser, titanium sapphire laser, thulim YAG laser, ytterbium YAG laser, $ytterbium_2O_3$ laser or cerium doped lasers and combinations thereof.

The sample may be irradiated with one or more of the above-mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the interrogation point of a flow cell with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the interrogation point of the flow cell may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be a plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the interrogation point of the flow cell may be irradiated with the light sources simultaneously or sequentially, or a combination thereof. For example, the interrogation point of a flow cell may be simultaneously irradiated with each of the light sources. In other embodiments, the interrogation point of the flow cell is sequentially irradiated with each of the light sources. Where more than one light source is employed to irradiate the interrogation point of the flow cell sequentially, the time each light source irradiates the interrogation point may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g., laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to microseconds. In embodiments where the interrogation point is sequentially irradiated with two or more light sources, the duration the sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where the interrogation point of the flow cell is sequentially irradiated by more than two (i.e., 3 or more) light sources, the delay between irradiation by each light source may be the same or different.

The interrogation point of the flow cell may be irradiated continuously or in discrete intervals. In some instances, methods include irradiating the interrogation point of the flow cell with the light source continuously. In other instances, the interrogation point of the flow cell is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the interrogation point of the flow cell may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle of irradiation may also vary, ranging from 10° to 90°, such as from 15° to 85°, such as from 20° to 80°, such as from 25° to 75° and including from 30° to 60°, for example at a 90° angle.

In certain embodiments, methods include irradiating the interrogation point of the flow cell with two or more beams of frequency shifted light. A light beam generator component may be employed having a laser and an acousto-optic device for frequency shifting the laser light. In these embodiments, methods include irradiating the acousto-optic device with the laser. Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The acousto-optic device may be irradiated with one or more lasers, such as 2 or more lasers, such as 3 or more lasers, such as 4 or more lasers, such as 5 or more lasers and including 10 or more lasers. The lasers may include any combination of types of lasers. For example, in some embodiments, the methods include irradiating the acousto-optic device with an array of lasers, such as an array having one or more gas lasers, one or more dye lasers and one or more solid-state lasers.

Where more than one laser is employed, the acousto-optic device may be irradiated with the lasers simultaneously or sequentially, or a combination thereof. For example, the acousto-optic device may be simultaneously irradiated with each of the lasers. In other embodiments, the acousto-optic device is sequentially irradiated with each of the lasers. Where more than one laser is employed to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to microseconds. In embodiments where the acousto-optic device is sequentially irradiated with two or more lasers, the duration the acousto-optic device is irradiated by each laser may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to microseconds. In certain embodiments, the time period between irradiation by each laser is 10 microseconds. In embodiments where the acousto-optic device is sequentially irradiated by more than two (i.e., 3 or more) lasers, the delay between irradiation by each laser may be the same or different.

The acousto-optic device may be irradiated continuously or in discrete intervals. In some instances, methods include irradiating the acousto-optic device with the laser continuously. In other instances, the acousto-optic device is irradiated with the laser in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the laser, the acousto-optic device may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle of irradiation may also vary, ranging from 10° to 90°, such as from 15° to 85°, such as from 20° to 80°, such as from 25° to 75° and including from 30° to 60°, for example at a 90° angle.

In embodiments, methods include applying radiofrequency drive signals to the acousto-optic device to generate angularly deflected laser beams. Two or more radiofrequency drive signals may be applied to the acousto-optic device to generate an output laser beam with the desired number of angularly deflected laser beams, such as 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including 100 or more radiofrequency drive signals.

The angularly deflected laser beams produced by the radiofrequency drive signals each have an intensity based on the amplitude of the applied radiofrequency drive signal. In some embodiments, methods include applying radiofrequency drive signals having amplitudes sufficient to produce angularly deflected laser beams with a desired intensity. In some instances, each applied radiofrequency drive signal independently has an amplitude from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In these embodiments, the angularly deflected laser beams in the output laser beam are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, the flow stream is irradiated with a plurality of angularly deflected beams of frequency-shifted light and a cell in the flow stream is imaged by fluorescence imaging using radiofrequency tagged emission (FIRE) to generate a frequency-encoded image, such as those described in Diebold, et al. Nature Photonics Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

As discussed above, in embodiments light from the interrogation point of the flow cell is conveyed to a detector as described in greater detail below and may be measured by, in some embodiments, a plurality of photodetectors. In some embodiments, methods include measuring the collected light over a range of wavelengths (e.g., 200 nm-1000 nm). For example, methods may include collecting spectra of light over one or more of the wavelength ranges of 200 nm-1000 nm. In yet other embodiments, methods include measuring collected light at one or more specific wavelengths. For example, the collected light may be measured at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, methods including measuring wavelengths of light which correspond to the fluorescence peak wavelength of fluorophores. In some embodiments, methods include measuring collected light across the entire fluorescence spectrum of each fluorophore in a sample flowing in a flow stream.

The collected light may be measured continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, the light propagation is measured 2 or more times, with the data in certain instances being averaged.

Light from the interrogation point may be measured at one or more wavelengths of, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring the collected light at 400 or more different wavelengths.

Methods according to the present disclosure further comprise producing a droplet stream from fluid exiting the flow cell with a droplet generator. As described above, the droplet generator may be any convenient device for producing a droplet stream from fluid exiting the flow cell. In some instances, the droplet generator is an oscillating transducer, such as, for example, a piezo-oscillator.

Methods according to the present disclosure further comprise deflecting droplets of the droplet stream with a droplet deflector configured to apply a known offset deflection force to the droplet stream. As described above, to sort target droplets, such as, for example, target droplets containing particles of interest, the analyzed droplet stream is subjected to a known offset deflection force by a droplet deflector (as described above).

As described in greater detail above, in some embodiments, the droplet deflector comprises first and second plates configured to be offset from one another. In such embodiments, the first and second plates may be configured to be adjustably offset from one another. In instances, the first and second plates may be configured to be adjustably offset from one another with respect to a horizontal plane. In such instances, the horizontal plane is perpendicular to the axis (i.e., the longitudinal axis) of the droplet stream.

In embodiments, the first plate comprises an elongated section configured to allow the first plate to be adjustably offset from the second plate with respect to the horizontal plane. In such embodiments, the elongated section of the first plate comprises a set screw configured to allow the first plate to be adjustably offset from the second plate with respect to the horizontal plane.

As described above, in examples, the first and second plates are configured to be adjustably offset from each other by greater than 0 mm to 5 mm. In such examples, the first and second plates are configured to be adjustably offset from each other in increments that are determined based on the threat pitch of a set screw configured to adjustably offset the first plate from the second plate.

In instances, the known offset deflection force is sufficient to offset a drop deposition position by 2 mm or more when measured at a distance of 140 mm below the lowest point of the first deflection plate. As such, the known offset deflection force comprises components in both the "side-to-side" axis and "front-to-back" axis of a horizontal plane orthogonal to the longitudinal axis of the flow stream, as described above. In other instances, the known offset deflection force is sufficient to offset a drop deposition position by one droplet diameter or less.

In some cases, the droplet deflector according to the present disclosure is configured to deflect droplets into a plurality of partitions. In such cases, the partitions may comprise a collection container. In other cases, the collection container may be a multi-well plate. In still other cases, the multi-well plate contains 1536 or fewer wells. In some instances, the partitions comprise collection tubes. In such instances, the diameter of each collection tube is 1.8 mm or less.

As described above, the droplet deflectors of the subject methods may comprise first and second plates configured to be parallel to one another. That is, even when offset from each other, the first and second places face one other in a parallel manner. In other cases, the first and second plates are configured to be adjustably rotated to face one another. That is, as the offset between the first and second plates is adjusted, the first and second plates may be correspondingly rotated such that the plates face each other.

In some cases, the second plate comprises an elongated section configured to allow the second plate to be adjustably offset from the first plate with respect to the horizontal plane. In such cases, the elongated section of the second plate may comprise a set screw configured to allow the second plate to be adjustably offset from the first plate with respect to the horizontal plane.

As described in greater detail above, in embodiments, the droplet deflector further comprises an actuator, e.g., a motor, configured to adjust the offset between the first and second plates. In some embodiments, the actuator, e.g., motor, is operably linked to a feedback subsystem, as described above. In such embodiments, the feedback subsystem may comprise a controller operably connected to the actuator, e.g., motor, and to a detector configured to detect a distance a droplet of the droplet stream is offset. In still other embodiments, the feedback subsystem is configured to iteratively adjust the offset between the first and second plates.

In embodiments, the first and second plates are metallic. A voltage applied to each of the metallic plates such that droplets flowing therethrough are accelerated and deflected at a plurality of different angles based on the charge and polarity of the charge of the droplet. The voltage applied to the first and second metallic plates to divert charged particles may be 10 mV or more, such as 25 mV or more, such as 50 mV or more, such as 100 mV or more, such as 250 mV or more, such as 500 mV or more, such as 750 mV or more, such as 1000 mV or more, such as 2500 mV or more, such as 5000 mV or more, such as 10000 V or more, such as 15000 V or more, such as 25000 V or more, such as 50000 V or more and including 100000 V or more. In certain embodiments, the voltage applied to the first and second metallic plates is from 0.5 kV to kV, such as from 1 kV to 15 kV, such as from 1.5 kV to 12.5 kV and including from 2 kV to 10 kV. As such, the electric field strength between the metallic plates ranges from 0.1 V/m to $1\times10^7$ V/m, such as from 0.5 V/m to $5\times10^6$, such as from 1 V/m to $1\times10^6$ V/m, such as from 5 V/m to $5\times10^5$ V/m, such as from 10 V/m to $1\times10^5$ V/m and including from 50 V/m to $5\times10^4$ V/m, for example $1\times10^5$ V/m to $2\times10^6$ V/n.

In instances, the metallic plates are spaced apart by 1 mm or more. In other instances, the metallic plates are spaced apart by 3 mm or more. In examples, the first and second plates are rectangular.

In some embodiments, methods for sorting components of a sample include sorting particles (e.g., cells in a biological sample) with a particle sorting module such as described in U.S. Patent Publication No. 2017/0299493, filed on Mar. 28, 2017, the disclosure of which is incorporated herein by reference. In certain embodiments, cells of the sample are sorted using a sort decision module having a plurality of sort decision units, such as those described in U.S. Provisional Patent Application No. 62/803,264, filed on Feb. 8, 2019, the disclosure of which is incorporated herein by reference.

Particle Sorting Modules

Aspects of the present disclosure include a particle sorting module. In embodiments, particle sorting modules include a droplet deflector described herein that is configured to apply a known offset deflection force to a droplet stream and to, for example, divert droplets containing analyzed particles to a receiving location. As described in greater detail above, by applying an "offset deflection force," it is meant, for example, that the deflection force which diverts droplets in the droplet stream may comprise both a "side-to-side" direction and a "front-to-back" direction within a horizontal plane that is orthogonal to the droplet stream, and in some cases, the deflection force is offset by applying the deflection force after rotating the angle at which the deflection force is applied to the droplet stream around the longitudinal axis of the droplet stream. As described above, by applying a "known offset deflection force," it is meant applying a deflection force to droplets of a droplet stream that is offset by design or a predetermined amount.

Diversion of a droplet of interest to a receiving location may be achieved by the droplet deflector via, for example, electrostatic charging of the droplet and deflection of the charged droplet from the flow stream by the application of an electrostatic field. In such instances, the voltage applied to first and second plate of the droplet deflector in the subject particle sorting modules may be 10 mV or more, such as 25 mV or more, such as 50 mV or more, such as 75 mV or more, such as 100 mV or more, such as 250 mV or more, such as 500 mV or more, such as 750 mV or more, such as 1 V or more, such as 2.5 V or more, such as 5 V or more, such as 10 V or more, such as 25 V or more, such as 50 V or more and including 100 V or more, such as 500 V or more, such as 1000 V or more, such as 5000 V or more, such as 10000 V or more, such as 15000 V or more, such as 25000 V or more, such as 50000 V or more and including 100000 V or more. In certain embodiments, the voltage applied to each set of parallel metallic plates is from 0.5 kV to 15 kV, such as from 1 kV to 15 kV, such as from 1.5 kV to 12.5 kV and including from 2 kV to 10 kV.

In embodiments, particle sorting modules according to the present disclosure may be for sorting components of a sample, such as cells in a biological sample. The term "sorting" is used herein in its conventional sense to refer to separating components (e.g., cells, non-cellular particles such as biological macromolecules) of the sample and in some instances, as described below, delivering the separated components to a receiving location having one or more containers. For example, the subject particle sorting modules may be configured for sorting samples having 2 or more components, such as 3 or more components, such as 4 or more components, such as 5 or more components, such as 10 or more component, such as 15 or more components and including soring a sample having 25 or more components. One or more of the sample components may be separated from the sample and delivered to a container, such as 2 or more sample components, such as 3 or more sample components, such as 4 or more sample components, such as 5 or more sample components, such as 10 or more sample components and including 15 or more sample components may be separated from the sample and delivered to a container at the receiving location.

The particle sorting module may be configured to produce an analyzed stream of droplets and deflect each analyzed droplet from the stream of analyzed droplets to a deflected droplet receiving location (i.e., droplet deposition location).

As used herein, the term "deflected droplet receiving location" (i.e., droplet deposition location or position) refers to a location downstream (with respect to the sorted droplet stream) from the droplet deflector where a sorted droplet containing a cell of interest may be collected after it has been deflected by the droplet deflector. As described above, droplets in the flow stream may be diverted from their normal trajectory along the longitudinal axis of the droplet stream by a distance by 0.001 mm or more as measured radially across a plane orthogonal to the longitudinal axis of the flow stream, such as 0.005 mm or more, such as 0.01 mm or more, such as 0.05 mm or more, such as 0.1 mm or more, such as 0.5 mm or more, such as 1 mm or more, such as 2 mm or more, such as 5 mm or more, such as 10 mm or more, such as 15 mm or more, such as 20 mm or more, such as 25 mm or more, such as 30 mm or more, such as 35 mm or more and including 50 mm or more. For example, the droplets in the droplet stream may be diverted by a distance of from 0.001 mm to 100 mm, such as from 0.005 mm to 95 mm, such as from 0.001 mm to 90 mm, such as from 0.05 mm to 85 mm, such as from 0.01 mm to 80 mm, such as from 0.05 mm to 75 mm, such as from 0.1 mm to 70 mm, such as from 0.5 mm to 65 mm, such as from 1 mm 60 mm, such as from 5 mm to 55 mm and including from 10 mm to 50 mm. As such, the droplet receiving location may be 0.001 mm or more from the longitudinal axis of the flow stream, such as 0.005 mm or more, such as 0.01 mm or more, such as 0.05 mm or more, such as 0.1 mm or more, such as 0.5 mm or more, such as 1 mm or more, such as 2 mm or more, such as 5 mm or more, such as 10 mm or more, such as 15 mm or more, such as 20 mm or more, such as 25 mm or more, such as 30 mm or more, such as 35 mm or more and including 50 mm or more from the longitudinal axis of the flow stream. The droplet receiving location of the subject particle sorting modules may be at a plurality of different offsets with respect to a "front-to-back" axis of a horizontal plane perpendicular to the longitudinal axis of the flow stream, such as from one droplet diameter or less to 5 mm in the front to back axis, such as from one droplet diameter or less to 4 mm, such as from two droplet diameters to 3 mm, including two and a half droplet diameters to 2.5 mm.

In embodiments, subject particle sorting modules include a droplet deflector that comprises first and second plates configured to be offset from one another. In some embodiments, the first and second plates are configured to be adjustably offset from one another. In instances, the first and second plates are configured to be adjustably offset from one another with respect to a horizontal plane. In other instances, the horizontal plane is perpendicular to the axis of the droplet stream.

In some embodiments of the particle sorter module, the first plate comprises an elongated section configured to allow the first plate to be adjustably offset from the second plate with respect to the horizontal plane. In such embodiments, the elongated section of the first plate may comprise a set screw configured to allow the first plate to be adjustably offset from the second plate with respect to the horizontal plane.

In examples, the first and second plates of the particle sorting module are configured to be adjustably offset from each other by greater than 0 mm to 5 mm. In such examples, the first and second plates are configured to be adjustably offset from each other in increments that are determined based on the threat pitch of a set screw configured to adjustably offset the first plate from the second plate.

In instances of the particle sorting module, the known offset deflection force is sufficient to offset a drop deposition position by 2 mm or more, such as 2 mm or more when the offset is measured at a distance of 140 mm below the lowest point of the first deflection plate. As such, the known offset deflection force comprises components in both the "side-to-side" axis and "front-to-back" axis of a horizontal plane orthogonal to the longitudinal axis of the flow stream, as described above. In other instances, the known offset deflection force is sufficient to offset a drop deposition position by one droplet diameter or less.

In some cases, the droplet deflector of the particle sorting module according to the present disclosure is configured to deflect droplets into a plurality of partitions. In such cases, the partitions may comprise a collection container. In other cases, the collection container may be a multi-well plate. In still other cases, the multi-well plate contains 1536 or fewer wells. In some instances, the partitions comprise collection tubes. In such instances, the diameter of each collection tube is 1.8 mm or less.

As described above, the droplet deflectors of the subject particle sorting modules may comprise first and second plates configured to be parallel to one another. That is, even when offset from each other, the first and second plates remain oriented in a parallel configuration. In other cases, the first and second plates are configured to be adjustably rotated to face one another. That is, as the offset between the first and second plates is adjusted, the first and second plates may be correspondingly rotated such that the plates face each other.

In some cases, the second plate of the droplet deflector comprises an elongated section configured to allow the second plate to be adjustably offset from the first plate with respect to the horizontal plane. In such cases, the elongated section of the second plate may comprise a set screw configured to allow the second plate to be adjustably offset from the first plate with respect to the horizontal plane.

As described in greater detail above, in embodiments, the droplet deflector of the particle sorting module further comprises an actuator, e.g., a motor, configured to adjust the offset between the first and second plates. In some embodiments, the actuator, e.g., motor, is operably linked to a feedback subsystem, as described above. In such embodiments, the feedback subsystem may comprise a controller operably connected to the actuator, e.g., motor, and to a detector configured to detect a distance a droplet of the droplet stream is offset. In still other embodiments, the feedback subsystem is configured to iteratively adjust the offset between the first and second plates.

In embodiments, the particle sorting module comprises a droplet deflector wherein the first and second plates are metallic. A voltage may be applied to each of the metallic plates of the droplet deflector such that droplets flowing therethrough are accelerated and deflected at a plurality of different angles based on the charge and polarity of the charge of the droplet. The voltage applied to the first and second metallic plates to divert charged droplets may be 10 mV or more, such as 25 mV or more, such as 50 mV or more, such as 100 mV or more, such as 250 mV or more, such as 500 mV or more, such as 750 mV or more, such as 1000 mV or more, such as 2500 mV or more, such as 5000 mV or more, such as 10000 V or more, such as 15000 V or more, such as 25000 V or more, such as 50000 V or more and including 100000 V or more. In certain embodiments, the voltage applied to the first and second metallic plates is from 0.5 kV to kV, such as from 1 kV to 15 kV, such as from 1.5 kV to 12.5 kV and including from 2 kV to 10 kV. As such, the electric field strength between the metallic plates ranges from 0.1 V/m to $1 \times 10^7$ V/m, such as from 0.5 V/m to $5 \times 10^6$, such as from 1 V/m to $1\times10^6$ V/m, such as from 5 V/m to $5\times10^5$ V/m, such as from 10 V/m to $1\times10^5$ V/m and including from 50 V/m to $5\times10^4$ V/m, for example $1\times10^5$ V/m to $2\times10^6$ V/n.

In instances, the metallic plates of the droplet deflector are spaced apart by 1 mm or more. In other instances, the metallic plates are spaced apart by 3 mm or more. In examples, the first and second plates are rectangular.

UTILITY

The subject particle sorter, methods and particle sorting module find use in a variety of applications where it is desirable to sort particle components, such as cells, in a sample in a fluid medium, such as a biological sample. In some embodiments, the particle sorters, methods and particle sorter modules described herein find use in flow cytometry characterization of biological samples labeled with fluorescent tags. In other embodiments, the particle sorters, methods and particle sorter modules find use in spectroscopy of emitted light. In addition, the subject particle sorters, methods and particle sorter modules find use in improving the efficiency of sorting a sample (e.g., in a flow stream). By improving the efficiency of sorting a sample, it is meant that fewer particles, such as cells, of a sample may be wasted (i.e., disposing of particles such as cells such that they go unused) when sorting a sample when the subject particle sorters, methods and particle sorter modules are employed. In particular, the subject particle sorters and methods may improve efficiency of sorting and in particular reduce the number of cells wasted when droplets containing target particles, such as target cells, are deflected but are not received in the designated partition, such as a collection container, due a lack of alignment between the deflected droplet and the partition resulting from applying a deflection force that is not a known offset deflection force. In certain instances, the efficiency of sorting may be improved such that more variations of particles may be collected and sorted when the subject particle sorters, methods and particle sorter modules are employed. By variations of particles, it is meant, for example, cell phenotypes, such that a larger number of different cell phenotypes are sorted when embodiments of the present disclosure are employed. Embodiments of the present disclosure find use where it is desirable to provide a flow cytometer with improved cell sorting efficiency, enhanced particle collection, particle charging efficiency, more accurate particle charging and enhanced particle deflection during cell sorting.

Embodiments of the present disclosure also find use in applications where cells prepared from a biological sample may be desired for research, laboratory testing or for use in therapy. In some embodiments, the subject methods and devices may facilitate obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Notwithstanding the appended claims, the disclosure is also defined by the following clauses:

1. A particle sorter comprising:
   a flow cell;
   a light source for irradiating an interrogation point of the flow cell;
   a detector for detecting light from the interrogation point;
   a droplet generator for producing a droplet stream from fluid exiting the flow cell; and
   a droplet deflector configured to apply a known offset deflection force to the droplet stream.

2. The particle sorter according to clause 1, wherein the droplet deflector comprises first and second plates configured to be offset from one another.

3. The particle sorter according to clause 2, wherein the first and second plates are configured to be adjustably offset from one another.

4. The particle sorter according to clause 3, wherein the first and second plates are configured to be adjustably offset from one another with respect to a horizontal plane.

5. The particle sorter according to clause 4, wherein the horizontal plane is perpendicular to the axis of the droplet stream.

6. The particle sorter according to clause 4, wherein the first plate comprises an elongated section configured to allow the first plate to be adjustably offset from the second plate with respect to the horizontal plane.

7. The particle sorter according to clause 6, wherein the elongated section of the first plate comprises a set screw configured to allow the first plate to be adjustably offset from the second plate with respect to the horizontal plane.

8. The particle sorter according to any of clauses 3-7, wherein the first and second plates are configured to be adjustably offset from each other by greater than 0 mm to 5 mm.

9. The particle sorter according to clause 7, wherein the first and second plates are configured to be adjustably offset from each other in increments determined by the thread pitch of the set screw.

10. The particle sorter according to any of clauses 1-9, wherein the known offset deflection force is sufficient to offset a drop deposition position by 2 mm or more.

11. The particle sorter according to any of clauses 1-10, wherein the known offset deflection force is sufficient to offset a drop deposition position by one droplet diameter or less.

12. The particle sorter according to any of clauses 1-11, further comprising a plurality of partitions configured to receive droplets deflected by the droplet deflector.

13. The particle sorter according to clause 12, wherein the partitions comprise a collection container.

14. The particle sorter according to clause 13, wherein the collection container is a multi-well plate.

15. The particle sorter according to clause 14, wherein the multi-well plate contains 1536 or fewer wells.

16. The particle sorter according to clause 12, wherein the partitions comprise collection tubes.

17. The particle sorter according to clause 12, wherein the diameter of each partition is 1.8 mm or less.

18. The particle sorter according to any of clauses 2-9, wherein the first and second plates are configured to be parallel to one another.

19. The particle sorter according to any of clauses 3-9, wherein the first and second plates are configured to be adjustably rotated to face one another.

20. The particle sorter according to clause 6, wherein the second plate comprises an elongated section configured to allow the second plate to be adjustably offset from the first plate with respect to the horizontal plane.

21. The particle sorter according to clause 20, wherein the elongated section of the second plate comprises a set screw configured to allow the second plate to be adjustably offset from the first plate with respect to the horizontal plane.

22. The particle sorter according to any of clauses 3-9, wherein the droplet deflector further comprises an actuator configured to adjust the offset between the first and second plates.

23. The particle sorter according to clause 22, wherein the actuator is operably linked to a feedback subsystem.

24. The particle sorter according to clause 23, wherein the feedback subsystem comprises a controller operably connected to the actuator and to a detector configured to detect a distance a droplet of the droplet stream is offset.

25. The particle sorter according to any of clauses 23-24, wherein the feedback subsystem is configured to iteratively adjust the offset between the first and second plates.

26. The particle sorter according to any of clauses 2-9, wherein the first and second plates are metallic.

27. The particle sorter according to clause 26, wherein the metallic plates are spaced apart by 1 mm or more.

28. The particle sorter according to clause 26, wherein the metallic plates are spaced apart by 3 mm or more.

29. The particle sorter according to any of clauses 2-9, wherein the first and second plates are rectangular.

30. The particle sorter according to any of clauses 1-29, wherein the light source is a laser.

31. A method comprising:
    irradiating with a light source an interrogation point of a flow cell;
    detecting light from the interrogation point with a detector;
    producing a droplet stream from fluid exiting the flow cell with a droplet generator; and
    deflecting droplets of the droplet stream with a droplet deflector configured to apply a known offset deflection force to the droplet stream.

32. The method according to clause 31, wherein the droplet deflector comprises first and second plates configured to be offset from one another.

33. The method according to clause 32, wherein the first and second plates are configured to be adjustably offset from one another.

34. The method according to clause 33, wherein the first and second plates are configured to be adjustably offset from one another with respect to a horizontal plane.

35. The method according to clause 34, wherein the horizontal plane is perpendicular to the axis of the droplet stream.

36. The method according to clause 34, wherein the first plate comprises an elongated section configured to allow the first plate to be adjustably offset from the second plate with respect to the horizontal plane.

37. The method according to clause 36, wherein the elongated section of the first plate comprises a set screw configured to allow the first plate to be adjustably offset from the second plate with respect to the horizontal plane.

38. The method according to any of clauses 33-37, wherein the first and second plates are configured to be adjustably offset from each other by greater than 0 mm to 5 mm.

39. The method according to clause 37, wherein the first and second plates are configured to be adjustably offset from each other in increments determined by the thread pitch of the set screw.

40. The method according to any of clauses 31-39, wherein the known offset deflection force is sufficient to offset a drop deposition position by 2 mm or more.

41. The method according to any of clauses 31-40, wherein the known offset deflection force is sufficient to offset a drop deposition position by one droplet diameter or less.

42. The method according to any of clauses 31-41, wherein the droplet deflector is further configured to deflect droplets into a plurality of partitions.

43. The method according to clause 42, wherein the partitions comprise a collection container.

44. The method according to clause 43, wherein the collection container is a multi-well plate.

45. The method according to clause 44, wherein the multi-well plate contains 1536 or fewer wells.

46. The method according to clause 42, wherein the partitions comprise collection tubes.

47. The method according to clause 42, wherein the diameter of each partition is 1.8 mm or less.

48. The method according to any of clauses 32-39, wherein the first and second plates are configured to be parallel to one another.

49. The method according to any of clauses 33-39, wherein the first and second plates are configured to be adjustably rotated to face one another.

50. The method according to clause 36, wherein the second plate comprises an elongated section configured to allow the second plate to be adjustably offset from the first plate with respect to the horizontal plane.

51. The method according to clause 50, wherein the elongated section of the second plate comprises a set screw configured to allow the second plate to be adjustably offset from the first plate with respect to the horizontal plane.

52. The method according to any of clauses 33-39, wherein the droplet deflector further comprises an actuator configured to adjust the offset between the first and second plates.

53. The method according to clause 52, wherein the actuator is operably linked to a feedback subsystem.

54. The method according to clause 53, wherein the feedback subsystem comprises a controller operably connected to the actuator and to a detector configured to detect a distance a droplet of the droplet stream is offset.

55. The method according to any of clauses 53-54, wherein the feedback subsystem is configured to iteratively adjust the offset between the first and second plates.

56. The method according to any of clauses 32-39, wherein the first and second plates are metallic.

57. The method according to clause 56, wherein the metallic plates are spaced apart by 1 mm or more.

58. The method according to clause 56, wherein the metallic plates are spaced apart by 3 mm or more.

59. The method according to any of clauses 32-39, wherein the first and second plates are rectangular.

60. The method according to any of clauses 31-59, wherein the flow stream is irradiated by a laser.

61. A particle sorting module comprising a droplet deflector configured to apply a known offset deflection force to a droplet stream.

62. The particle sorting module according to clause 61, wherein the droplet deflector comprises first and second plates configured to be offset from one another.

63. The particle sorting module according to clause 62, wherein the first and second plates are configured to be adjustably offset from one another.

64. The particle sorting module according to clause 63, wherein the first and second plates are configured to be adjustably offset from one another with respect to a horizontal plane.

65. The particle sorting module according to clause 64, wherein the horizontal plane is perpendicular to the axis of the droplet stream.

66. The particle sorting module according to clause 64, wherein the first plate comprises an elongated section configured to allow the first plate to be adjustably offset from the second plate with respect to the horizontal plane.

67. The particle sorting module according to clause 66, wherein the elongated section of the first plate comprises a set screw configured to allow the first plate to be adjustably offset from the second plate with respect to the horizontal plane.

68. The particle sorting module according to any of clauses 63-67, wherein the first and second plates are configured to be adjustably offset from each other by greater than 0 mm to 5 mm.

69. The particle sorting module according to clause 67, wherein the first and second plates are configured to be adjustably offset from each other in increments determined by the thread pitch of the set screw.

70. The particle sorting module according to any of clauses 61-69, wherein the known offset deflection force is sufficient to offset a drop deposition position by 2 mm or more.

71. The particle sorting module according to any of clauses 61-70, wherein the known offset deflection force is sufficient to offset a drop deposition position by one droplet diameter or less.

72. The particle sorting module according to any of clauses 61-71, wherein the droplet deflector is further configured to deflect droplets into a plurality of partitions.

73. The particle sorting module according to clause 72, wherein the partitions comprise a collection container.

74. The particle sorting module according to clause 73, wherein the collection container is a multi-well plate.

75. The particle sorting module according to clause 74, wherein the multi-well plate contains 1536 or fewer wells.

76. The particle sorting module according to clause 75, wherein the partitions comprise collection tubes.

77. The particle sorting module according to clause 72, wherein the diameter of each partition is 1.8 mm or less.

78. The particle sorting module according to any of clauses 62-69, wherein the first and second plates are configured to be parallel to one another.

79. The particle sorting module according to any of clauses 63-69, wherein the first and second plates are configured to be adjustably rotated to face one another.

80. The particle sorting module according to clause 66, wherein the second plate comprises an elongated section configured to allow the second plate to be adjustably offset from the first plate with respect to the horizontal plane.

81. The particle sorting module according to clause 80, wherein the elongated section of the second plate comprises a set screw configured to allow the second plate to be adjustably offset from the first plate with respect to the horizontal plane.

82. The particle sorting module according to any of clauses 63-69, wherein the droplet deflector further comprises an actuator configured to adjust the offset between the first and second plates.

83. The particle sorting module according to clause 82, wherein the actuator is operably linked to a feedback subsystem.

84. The particle sorting module according to clause 83, wherein the feedback subsystem comprises a controller operably connected to the actuator and to a detector configured to detect a distance a droplet of the droplet stream is offset.

85. The particle sorting module according to any of clauses 83-84, wherein the feedback subsystem is configured to iteratively adjust the offset between the first and second plates.

86. The particle sorting module according to any of clauses 62-69, wherein the first and second plates are metallic.

87. The particle sorting module according to clause 86, wherein the metallic plates are spaced apart by 1 mm or more.

88. The particle sorting module according to clause 86, wherein the metallic plates are spaced apart by 3 mm or more.

89. The particle sorting module according to any of clauses 62-69, wherein the first and second plates are rectangular.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112(f) or 35 U.S.C. § 112(6) is not invoked.

What is claimed is:
1. A method comprising:
irradiating with a light source an interrogation point of a flow cell;
detecting light from the interrogation point with a detector;

producing a droplet stream from fluid exiting the flow cell with a droplet generator;

adjusting a position of a first plate of a droplet deflector relative to a second plate of the droplet deflector and with respect to a horizontal plane perpendicular to the axis of the droplet stream by laterally offsetting the first plate by translating the first plate along a y-axis only, wherein the y-axis is orthogonal to a z-axis defined by the droplet stream exiting the flow cell and also orthogonal to an x-axis defined by a line between the first and second plates of the droplet deflector, while holding the second plate in a fixed position such that the droplet deflector is configured to apply a known offset deflection force to the droplet stream; and deflecting droplets of the droplet stream with the droplet deflector.

2. The method according to claim 1, wherein the first plate comprises an elongated section configured to allow the first plate to be adjustably offset from the second plate with respect to the horizontal plane.

3. The method according to claim 2, wherein the elongated section of the first plate comprises a set screw configured to allow the first plate to be adjustably offset from the second plate with respect to the horizontal plane.

4. The method according to claim 2, wherein the second plate comprises an elongated section configured to allow the second plate to be adjustably offset from the first plate with respect to the horizontal plane.

5. The method according to claim 4, wherein the elongated section of the second plate comprises a set screw configured to allow the second plate to be adjustably offset from the first plate with respect to the horizontal plane.

6. The method according to claim 2, wherein the elongated section is elongated relative to a corresponding section of the second plate.

7. The method according to claim 1, wherein the known offset deflection force is sufficient to offset a drop deposition position by one droplet diameter or less.

8. The method according to claim 1, wherein the droplet deflector is further configured to deflect droplets into a plurality of partitions.

9. The method according to claim 8, wherein the partitions comprise a collection container.

10. The method according to claim 9, wherein the collection container is a multi-well plate.

11. The method according to claim 8, wherein the partitions comprise collection tubes.

12. The method according to claim 1, wherein the first and second plates are configured to be parallel to one another.

13. The method according to claim 1, wherein the first and second plates are configured to be adjustably rotated to face one another.

14. The method according to claim 1, wherein the droplet deflector further comprises an actuator configured to adjust the offset between the first and second plates.

15. The method according to claim 14, wherein the actuator is operably linked to a feedback subsystem.

16. The method according to claim 15, wherein the feedback subsystem comprises a controller operably connected to the actuator and to a detector configured to detect a distance a droplet of the droplet stream is offset.

17. The method according to claim 1, wherein the flow stream is irradiated by a laser.

18. The method according to claim 1, wherein the droplet deflector is configured to translate the first plate relative to the second plate.

19. The method according to claim 1, wherein the droplet deflector is configured to translate the first plate relative to a fixed position of the second plate.

20. The method according to claim 1, wherein the first plate is asymmetrically opposed to the second plate.

21. The method according to claim 1, wherein deflecting droplets of the droplet stream with the droplet deflector by applying a known offset deflection force to the droplet stream with the droplet deflector comprises deflecting droplets in a direction comprising (i) an x-axis component based on applying an electric field to the droplet stream by the droplet deflector and (ii) a y-axis component based on adjusting the position of the first plate of the droplet deflector relative to the second plate of the droplet deflector and with respect to the horizontal plane.

22. The method according to claim 1, wherein laterally offsetting the first plate comprises translating the first plate while maintaining a constant distance from the flow cell.

23. The method according to claim 1, wherein laterally offsetting the first plate causes droplets to be deflected along a back-to-front axis that is orthogonal to droplet deflection caused by a charge applied to droplets and a voltage applied to the first and second plates of the droplet deflector.

* * * * *